(12) United States Patent
Cvek

(10) Patent No.: US 8,695,306 B2
(45) Date of Patent: Apr. 15, 2014

(54) METHODS AND ARRANGEMENTS FOR SECURING FABRIC

(76) Inventor: Sava Cvek, Jamaica Plain, MA (US)

( * ) Notice: Subject to any disclaimer, the term of this patent is extended or adjusted under 35 U.S.C. 154(b) by 79 days.

(21) Appl. No.: 13/303,138

(22) Filed: Nov. 22, 2011

(65) Prior Publication Data

US 2012/0297585 A1 Nov. 29, 2012

Related U.S. Application Data

(63) Continuation-in-part of application No. 11/835,366, filed on Aug. 7, 2007, now Pat. No. 8,061,107, which is a continuation of application No. 10/868,370, filed on Jun. 14, 2004, now Pat. No. 7,251,917.

(60) Provisional application No. 60/478,181, filed on Jun. 11, 2003.

(51) Int. Cl.
*E04B 1/12* (2006.01)
*E04C 2/40* (2006.01)

(52) U.S. Cl.
USPC ................. 52/660; 52/586.2; 52/222; 52/63; 52/463; 52/470; 52/471; 403/381; 160/395 E

(58) Field of Classification Search
USPC ....................... 52/222, 586.1, 586.2, 63, 459, 52/467–468, 470–471, 463–464; 24/455–464; 403/381; 160/382–404
See application file for complete search history.

(56) References Cited

U.S. PATENT DOCUMENTS

| | | | | |
|---|---|---|---|---|
| 3,165,110 A * | 1/1965 | Brooks | | 135/124 |
| 3,364,641 A * | 1/1968 | Brenneman | | 52/573.1 |
| 3,570,205 A * | 3/1971 | Payne | | 52/466 |
| 4,532,747 A * | 8/1985 | Koetje | | 52/586.1 |
| 7,861,473 B1 * | 1/2011 | Green | | 52/210 |
| 2004/0151540 A1 * | 8/2004 | Clements et al. | | 403/408.1 |
| 2009/0172586 A1 * | 7/2009 | Weaver | | 715/781 |

* cited by examiner

*Primary Examiner* — Jeanette E. Chapman
(74) *Attorney, Agent, or Firm* — O'Connell Law Firm; Thomas P. O'Connell

(57) ABSTRACT

An arrangement for securing fabric relative to a framework comprising a framework, a groove in the framework, and a locking spline for being received into the groove in the framework whereby a fabric panel can be retained relative to the framework by an insertion of the locking spline into the groove with a portion of the fabric panel disposed between the locking spline and the groove. The framework can have an obverse side, a peripheral edge, and a reverse side and the groove can be disposed to the reverse side of the framework whereby the fabric panel can be applied to the framework with a portion of the fabric panel retained within the groove and with the fabric panel reversing over the peripheral edge of the framework and traversing at least a portion of the framework. A secondary groove can enable a retention of a secondary material.

17 Claims, 35 Drawing Sheets

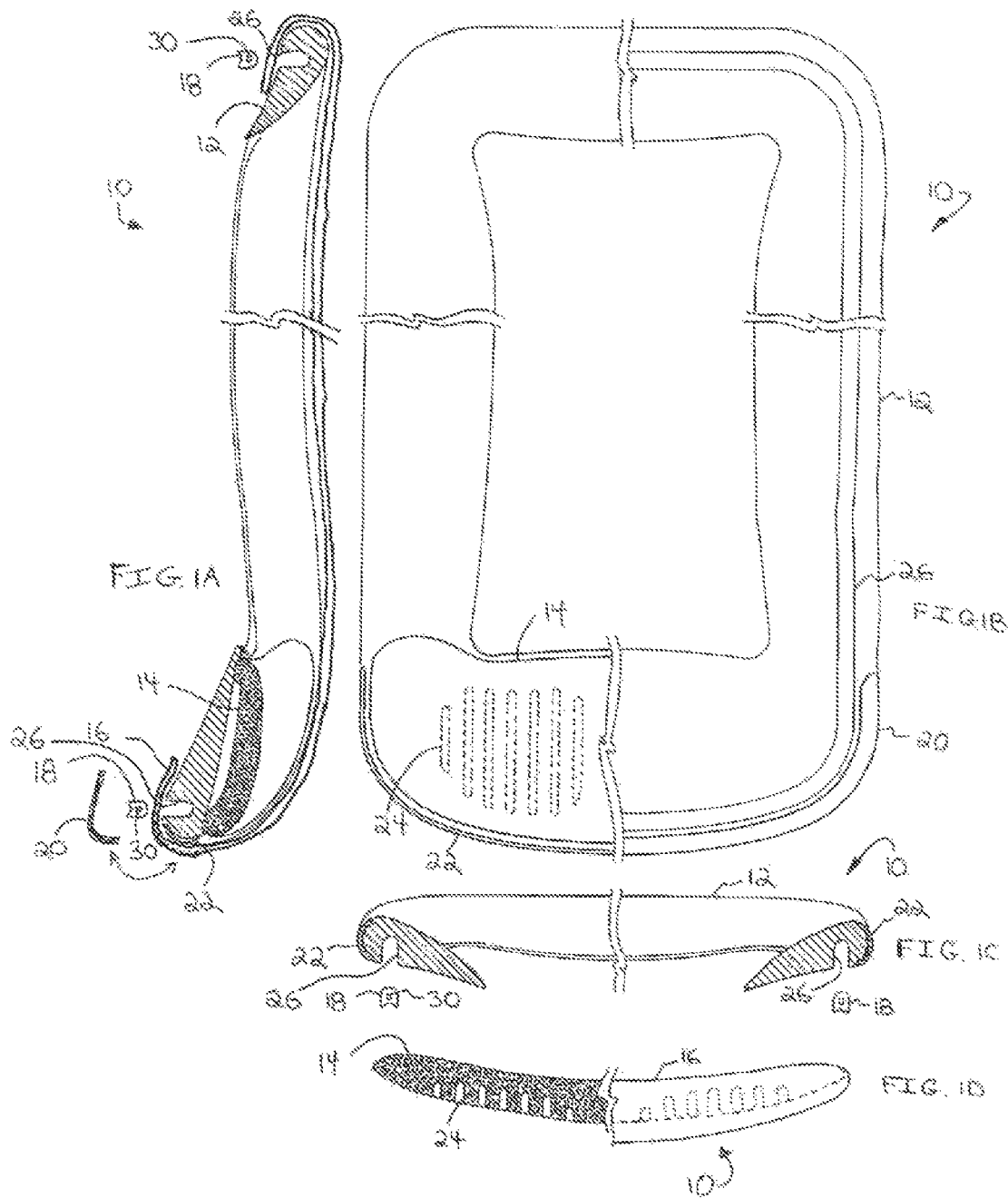

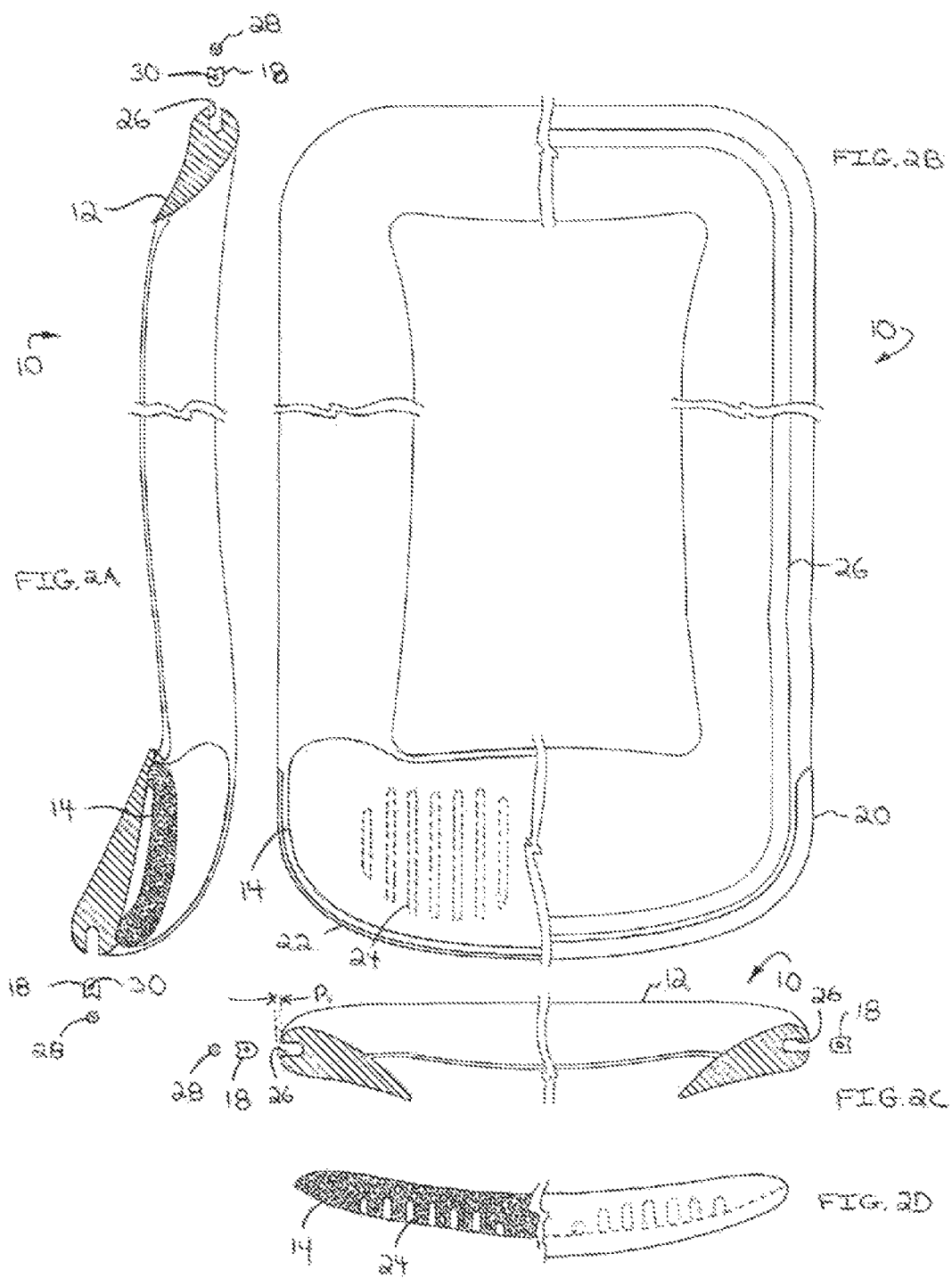

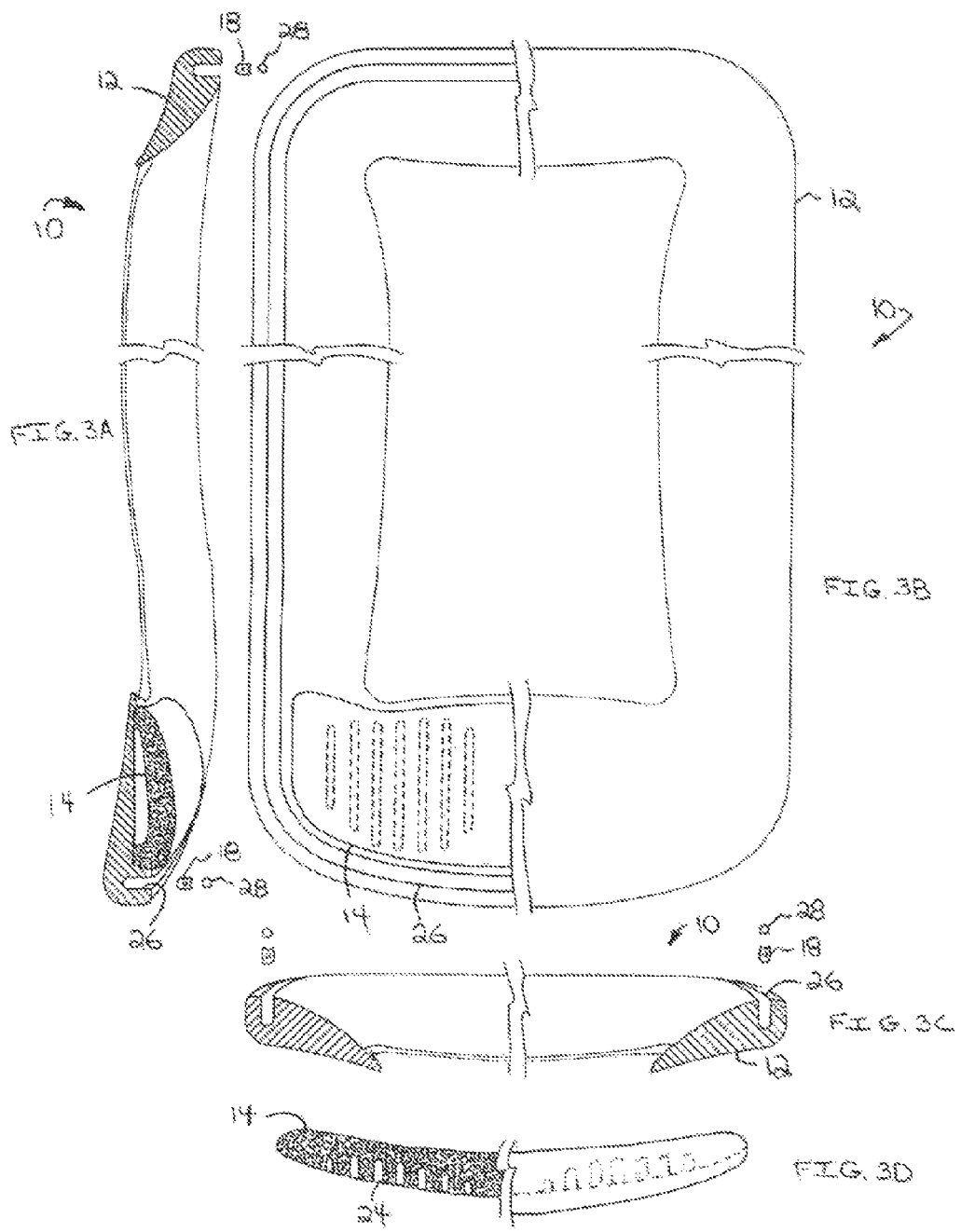

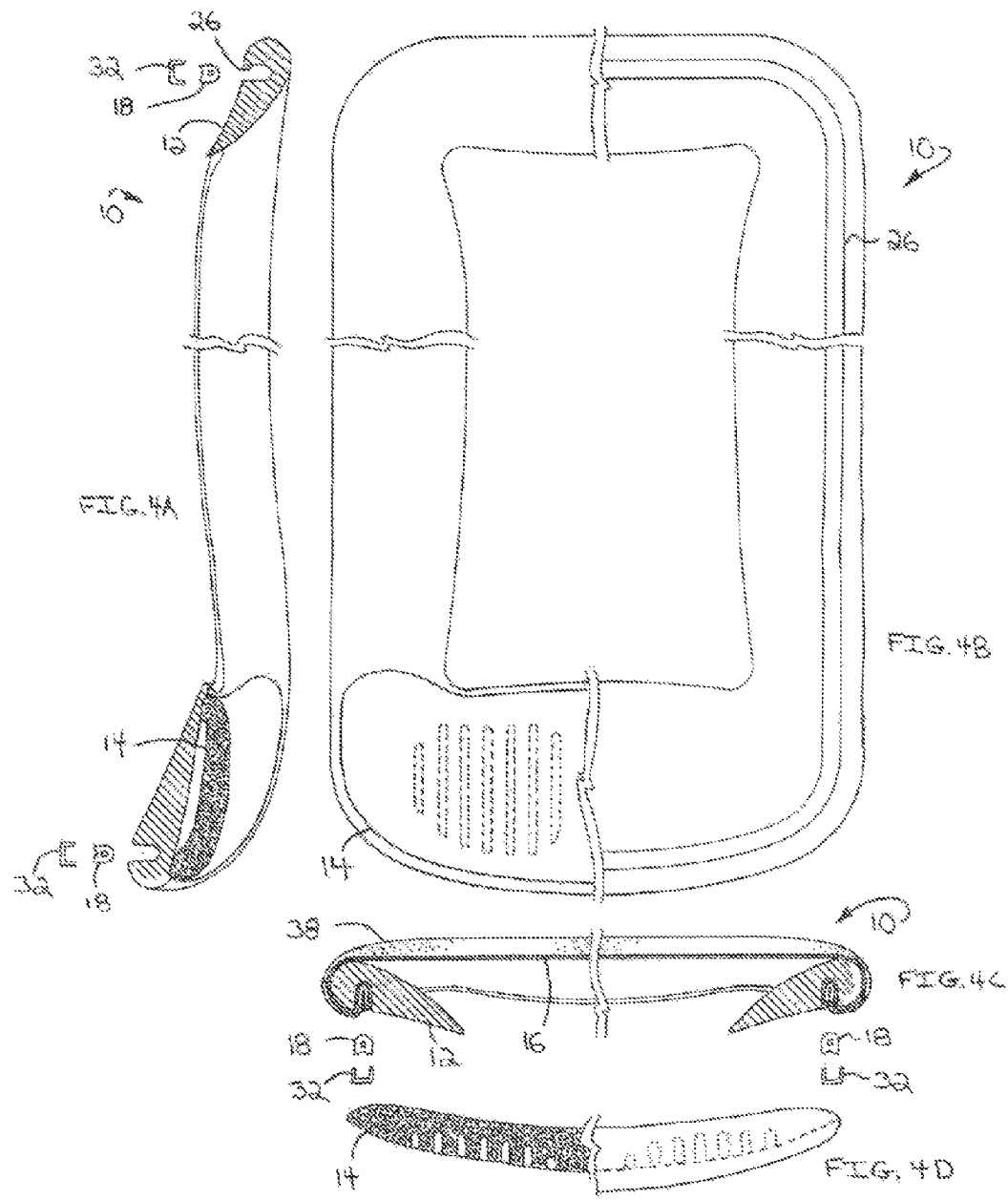

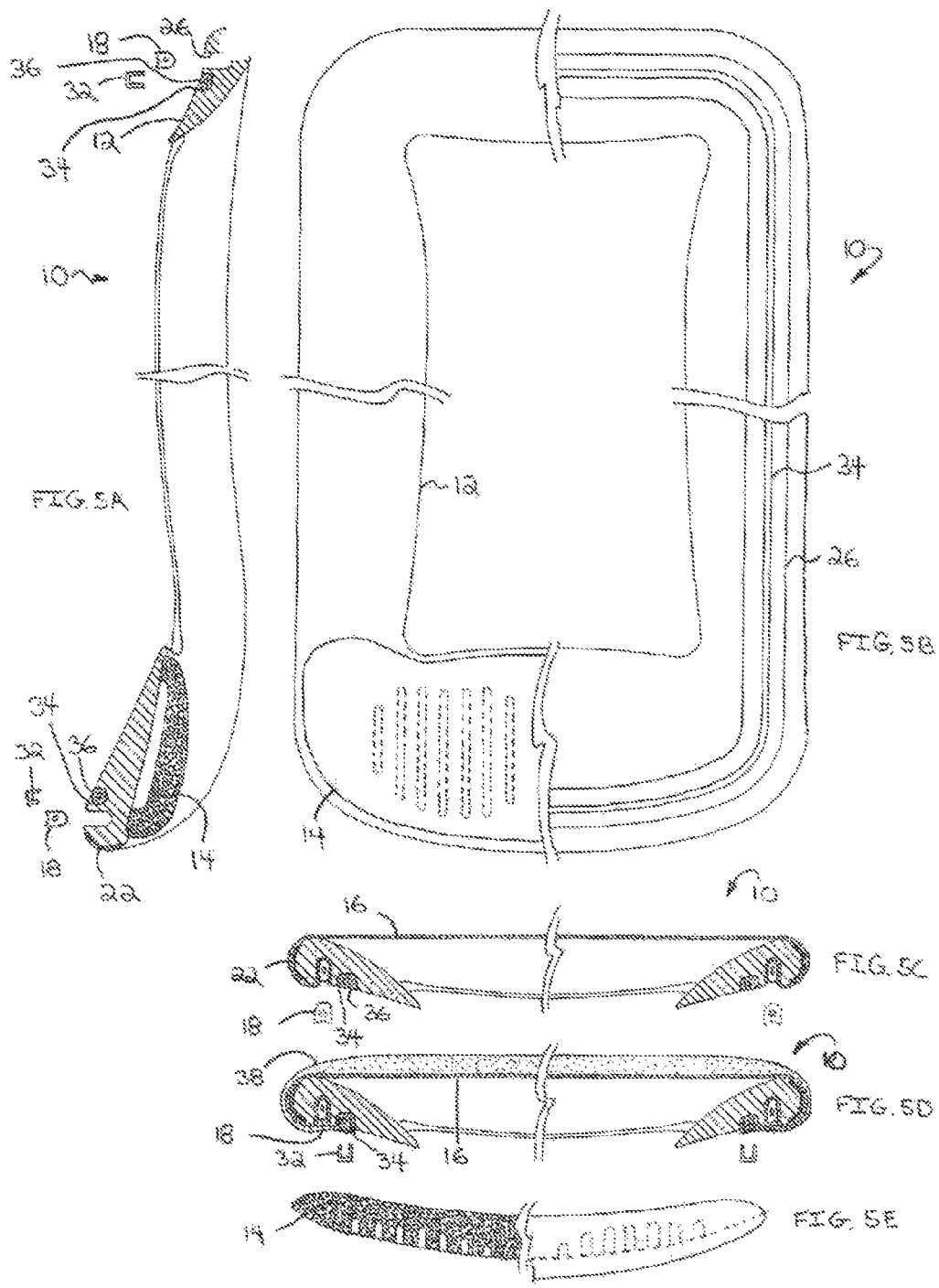

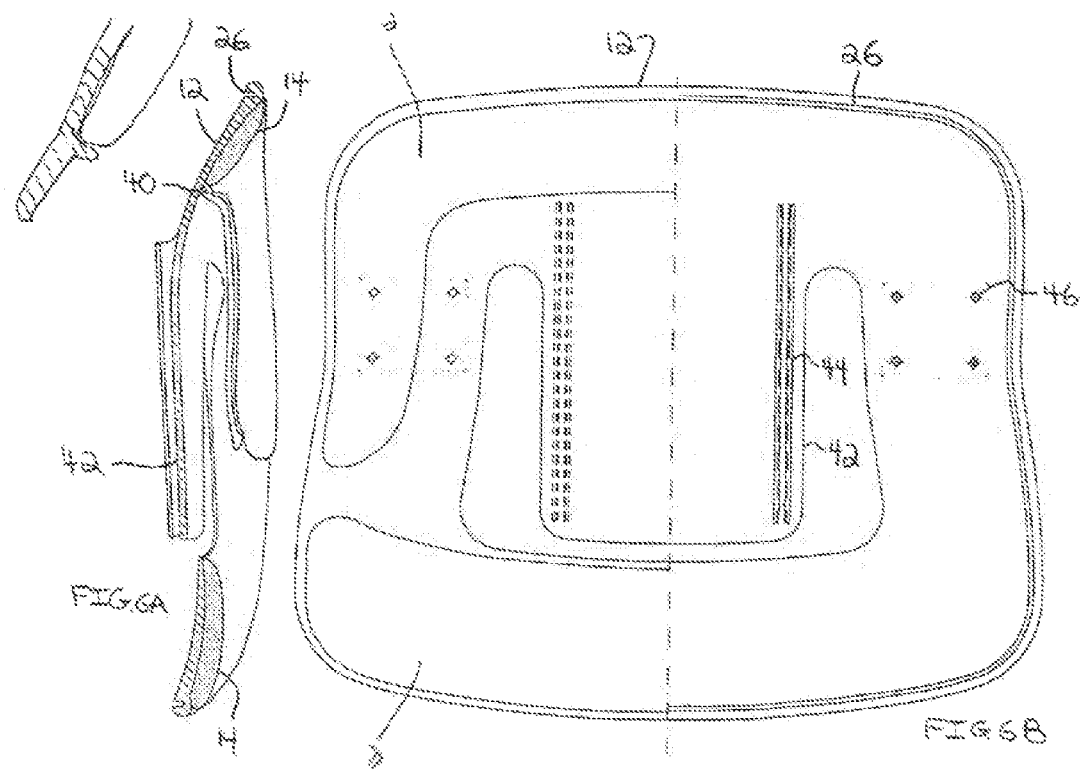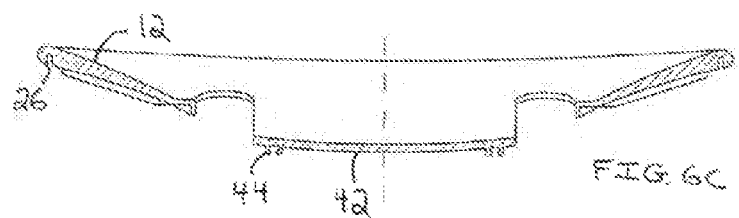

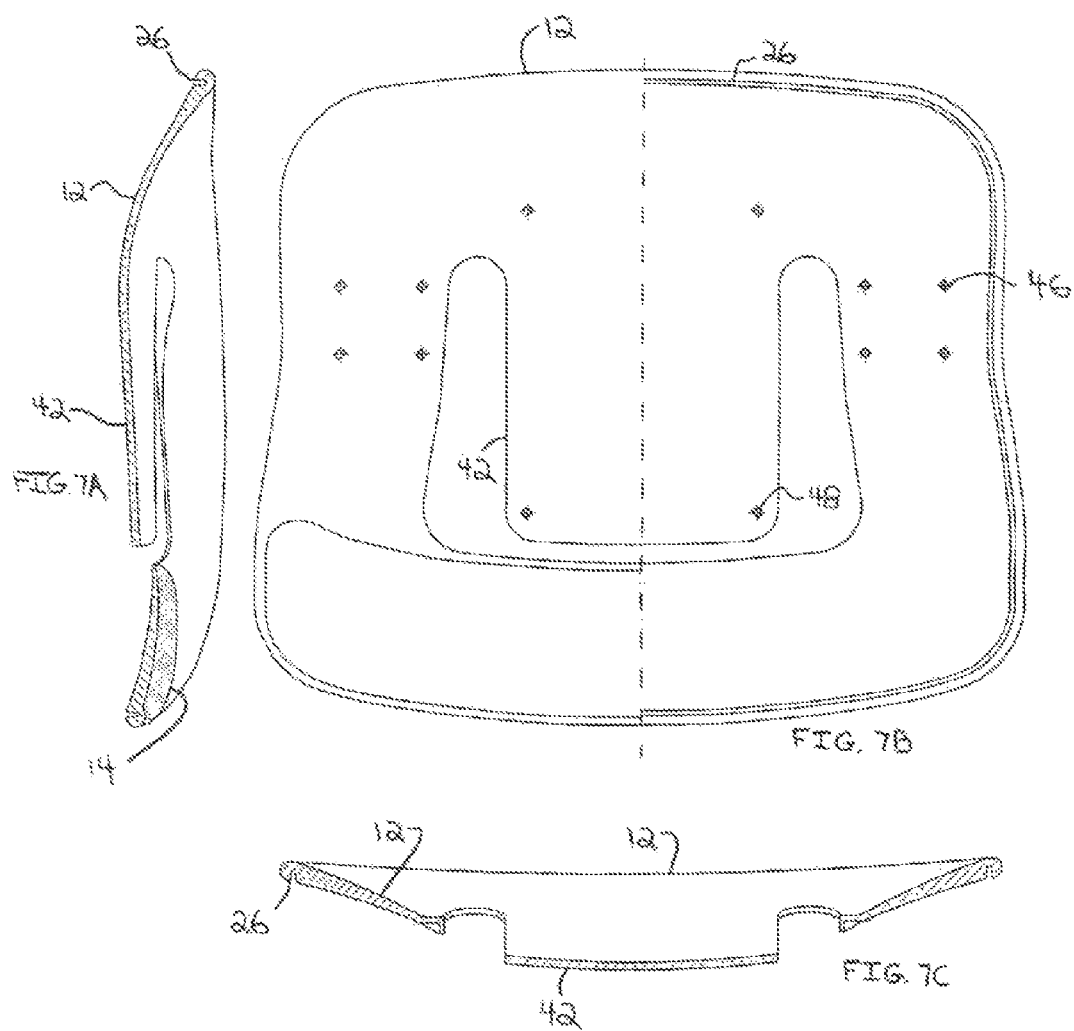

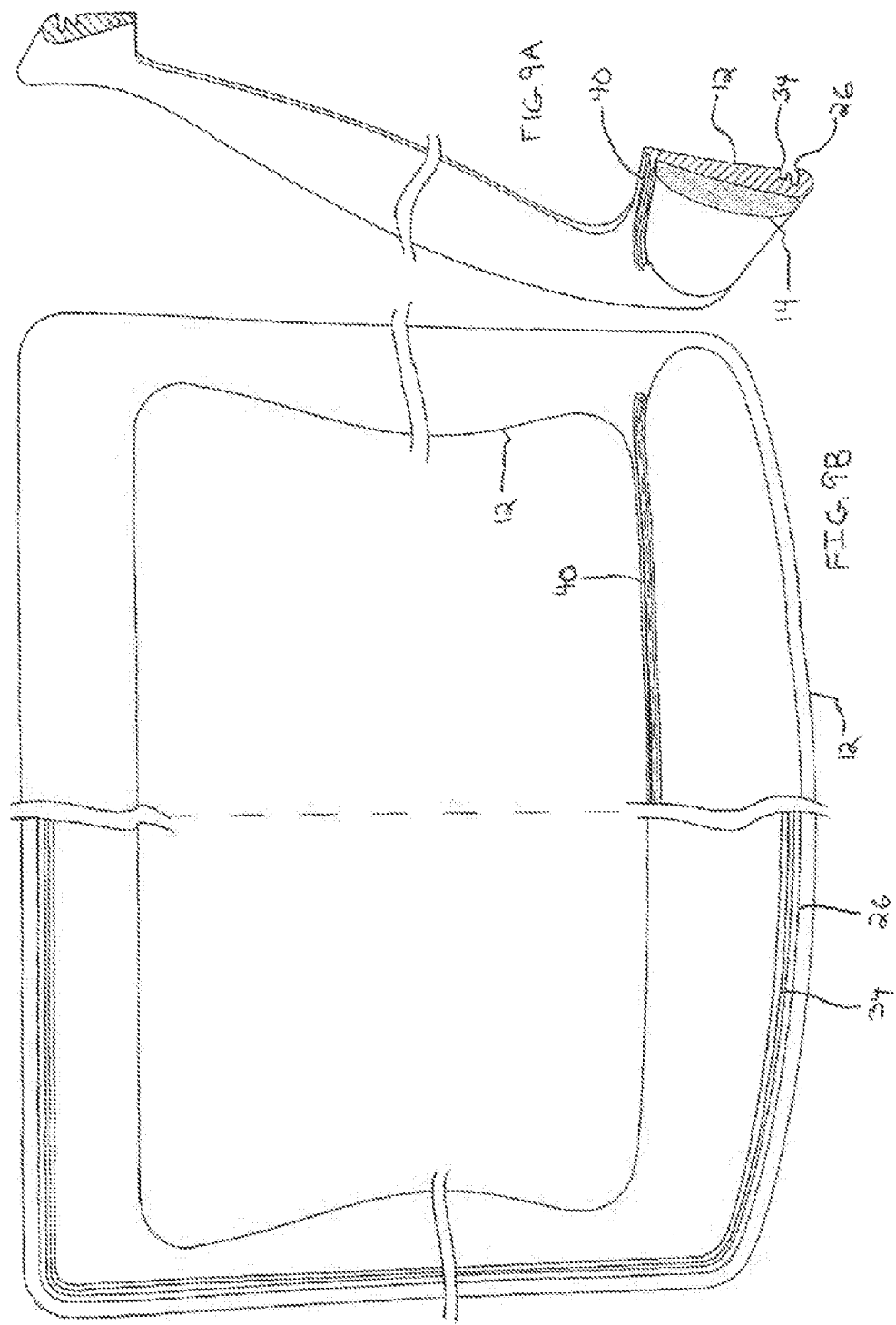

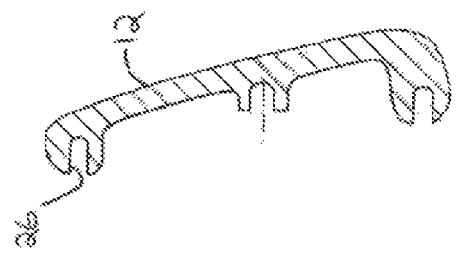
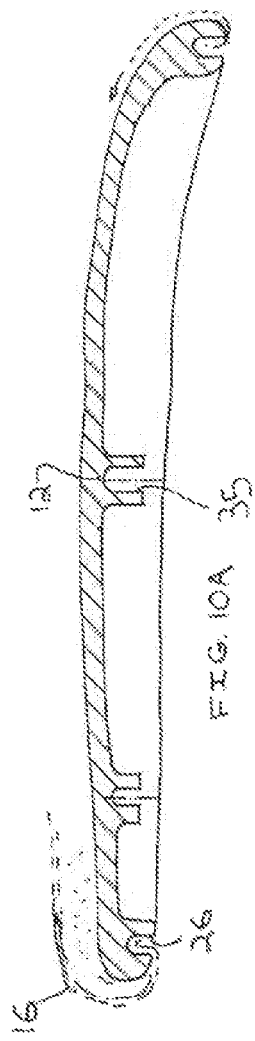
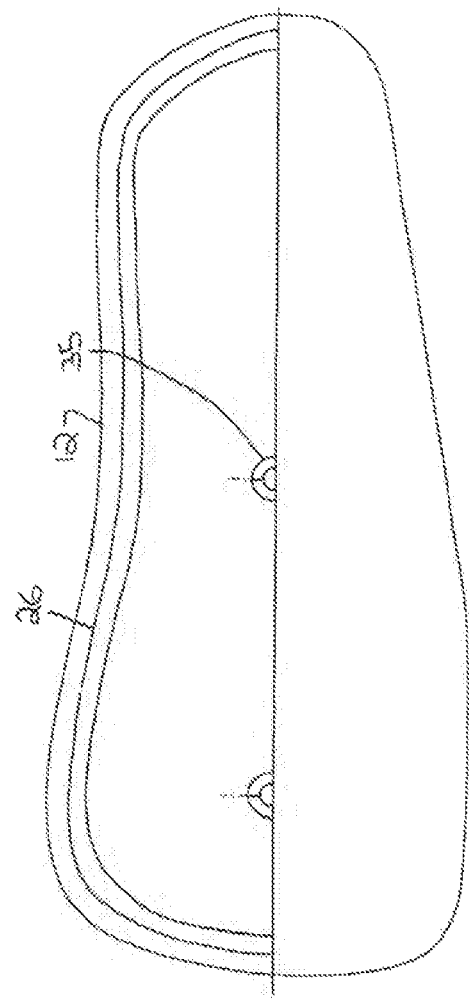

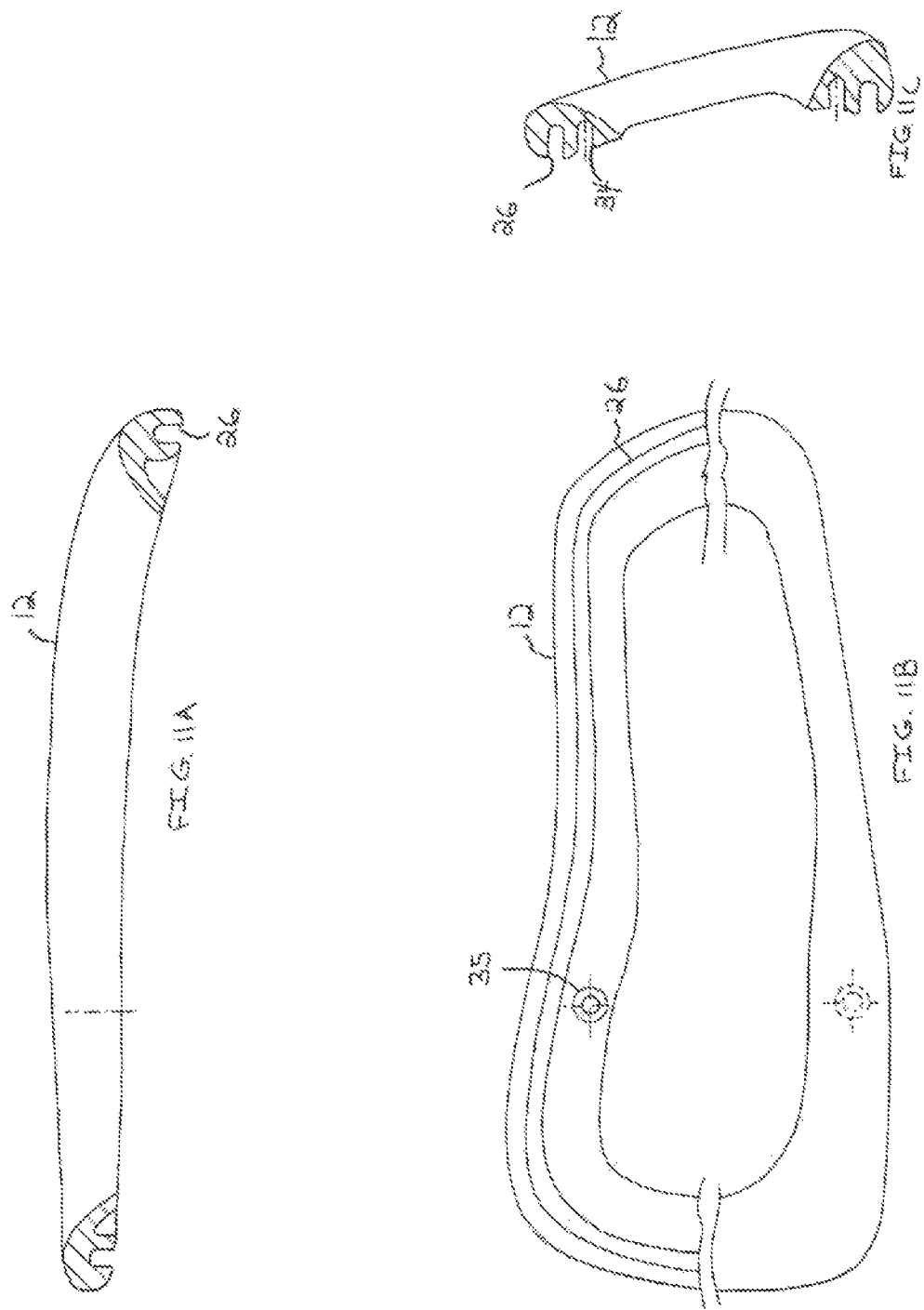

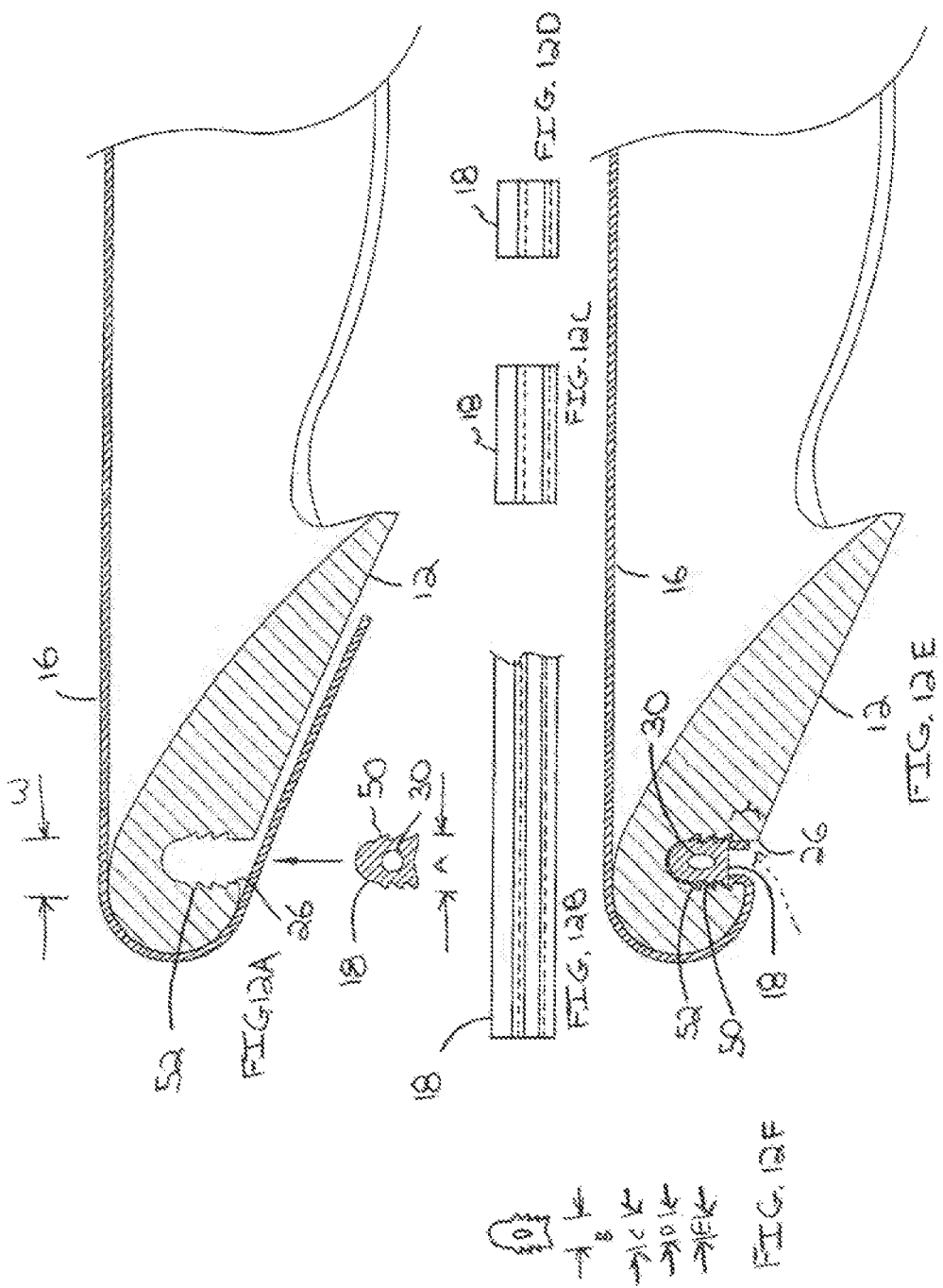

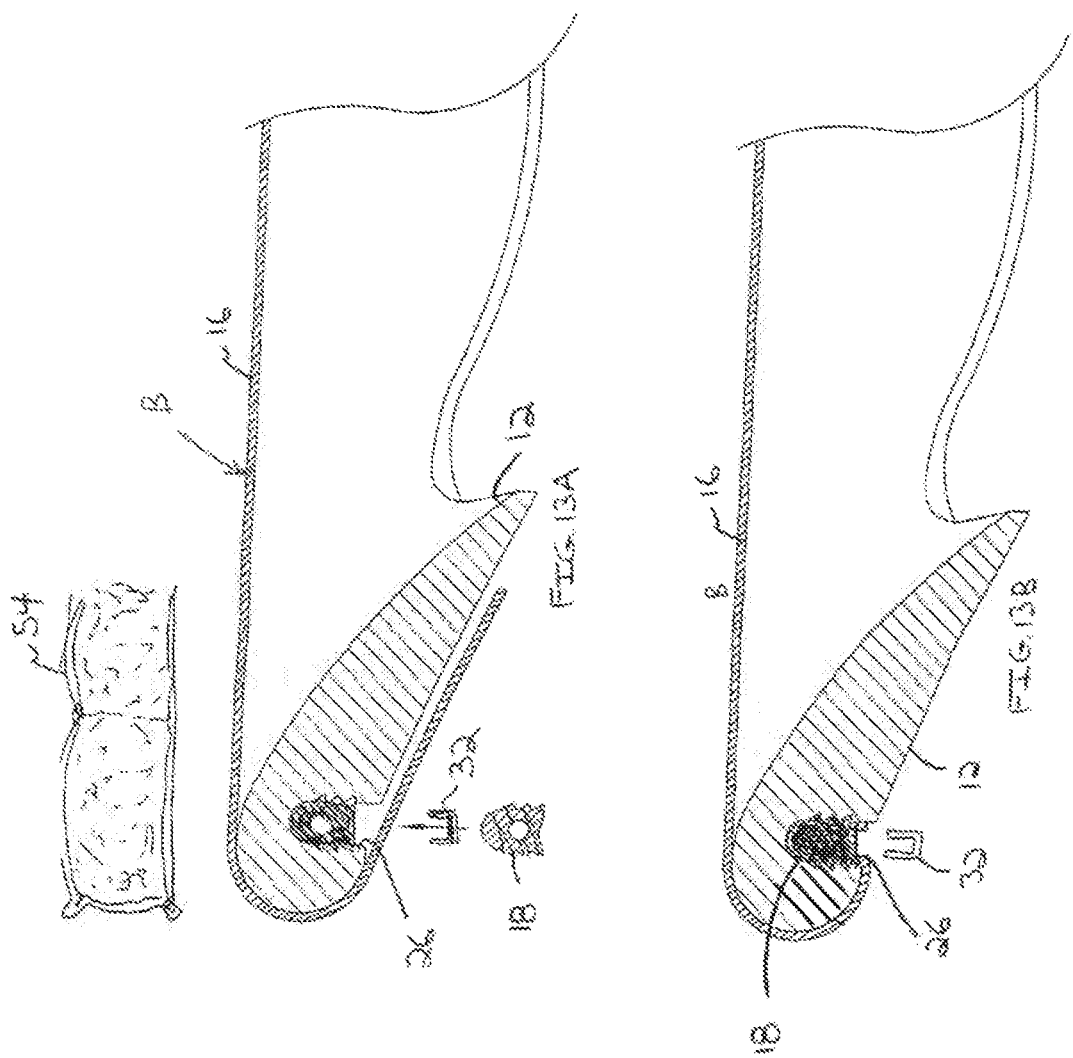

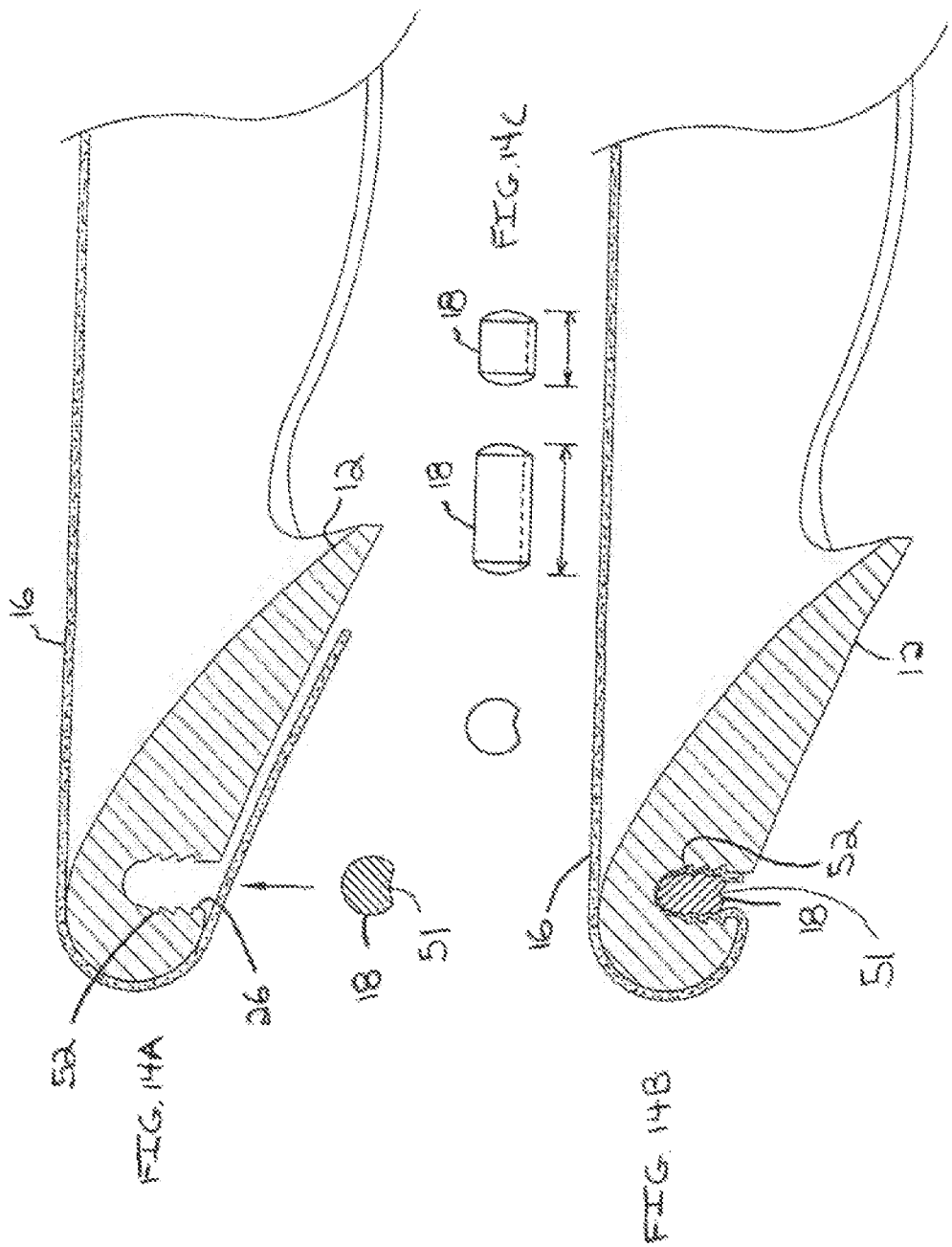

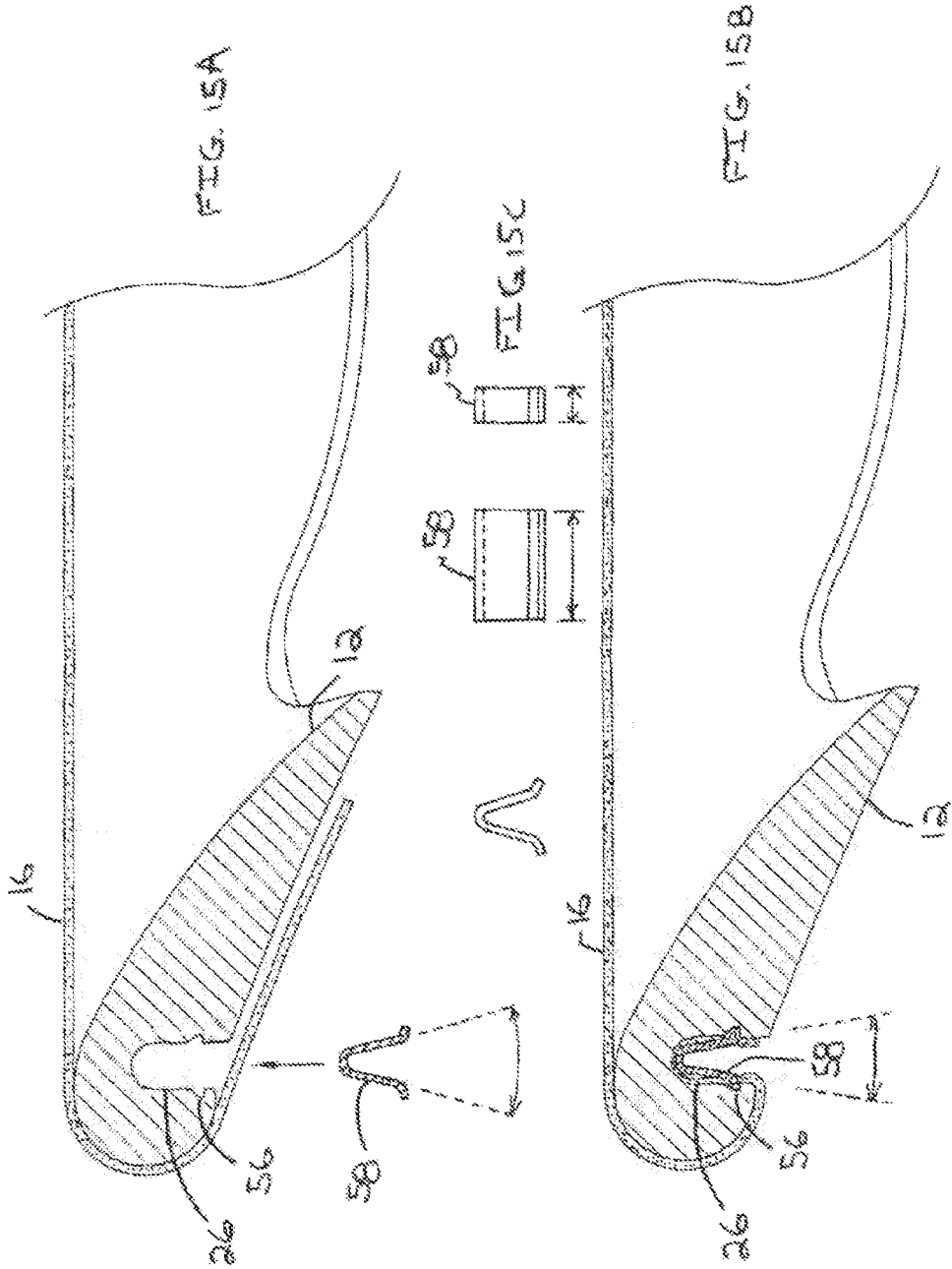

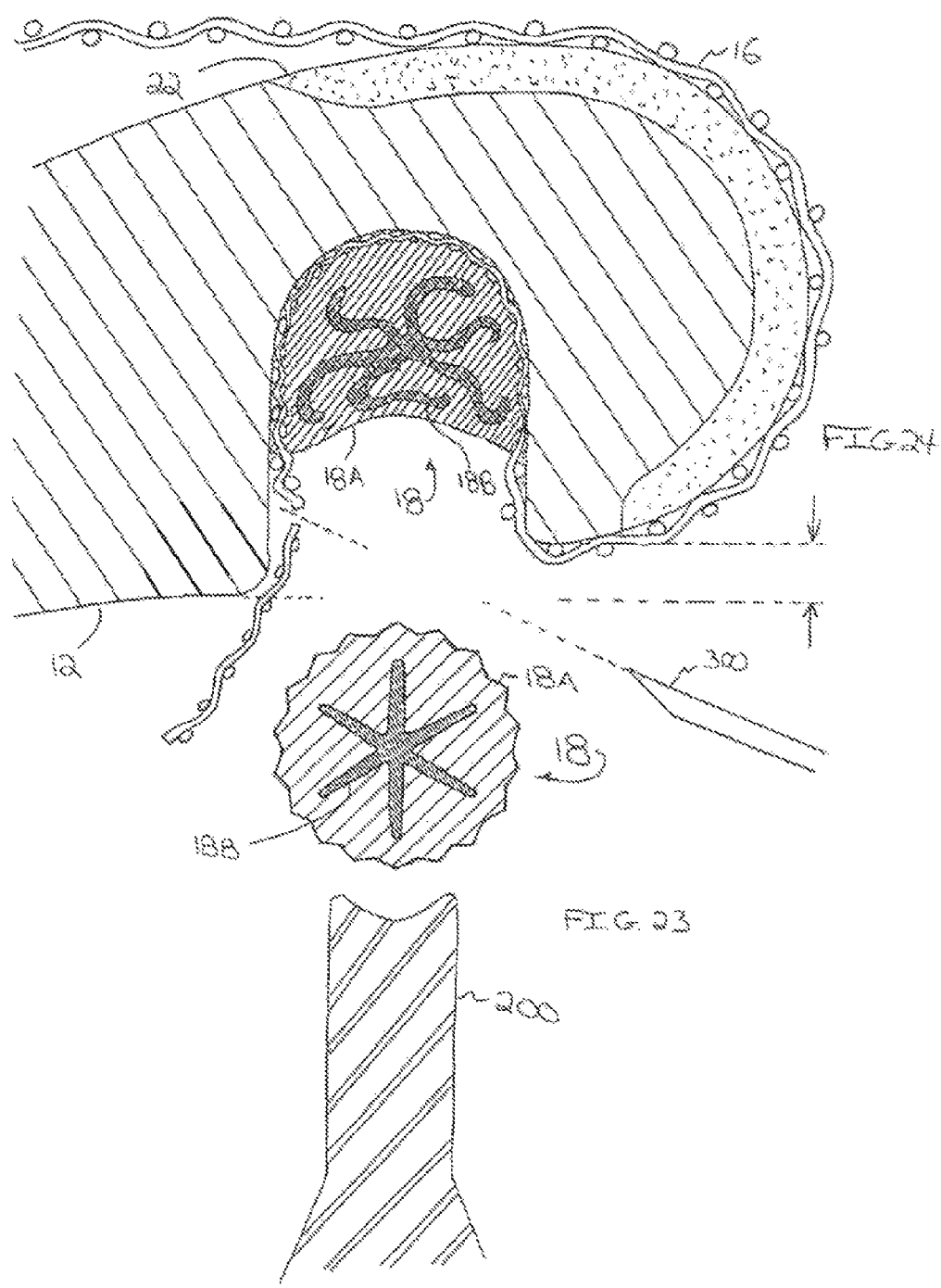

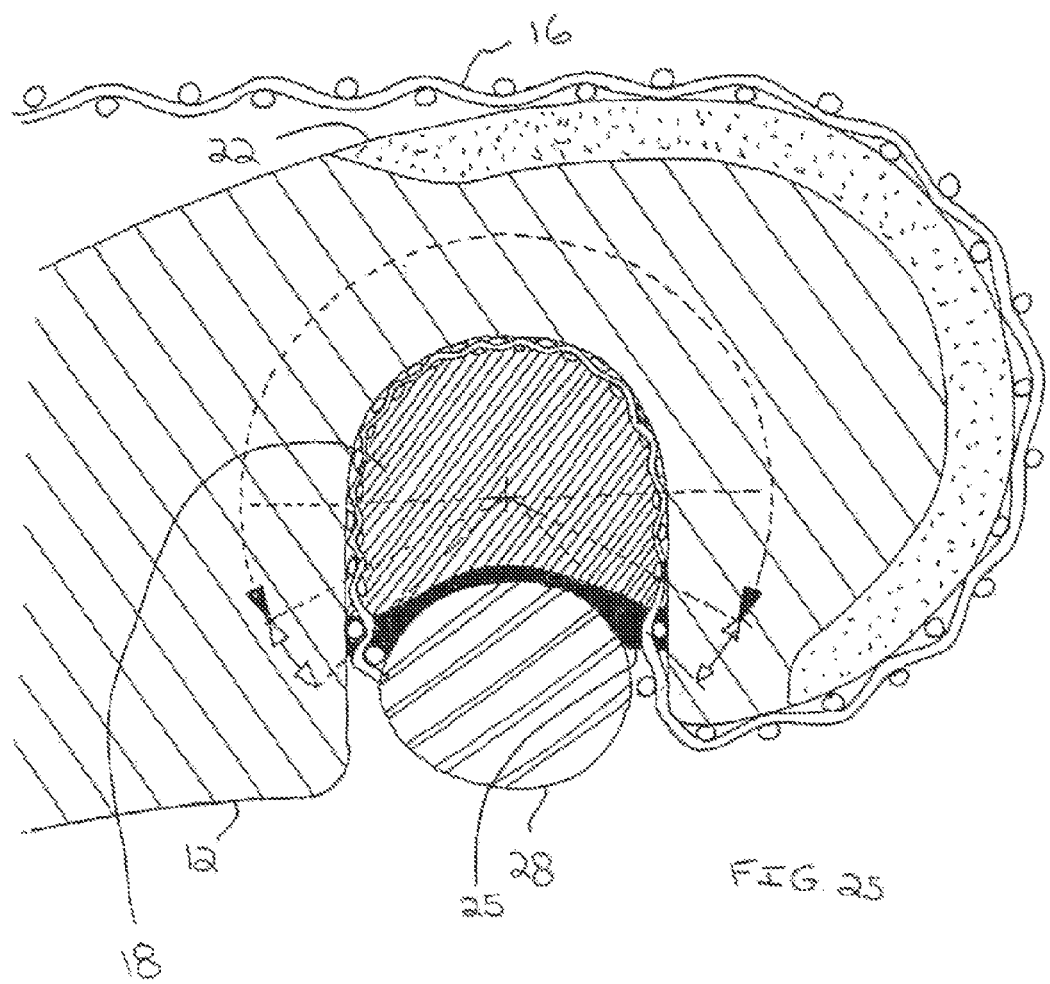

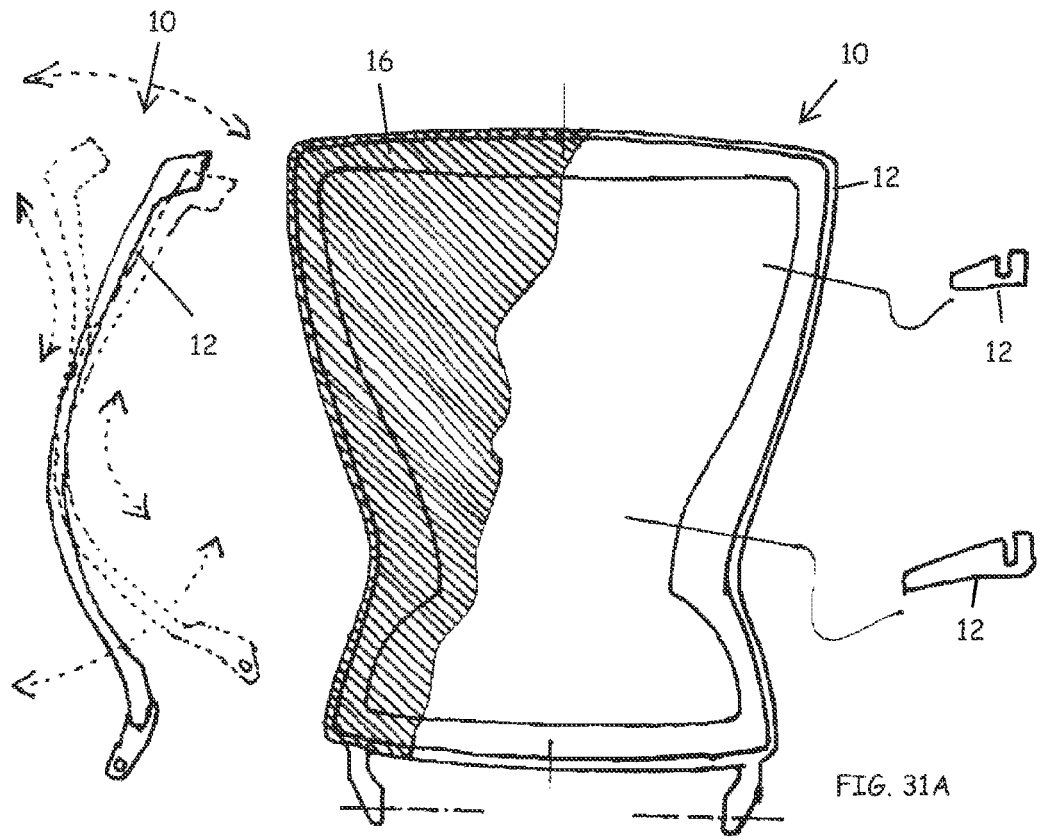
FIG. 31A
FIG. 31B
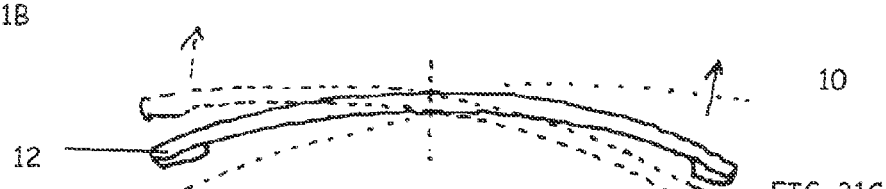
FIG. 31C
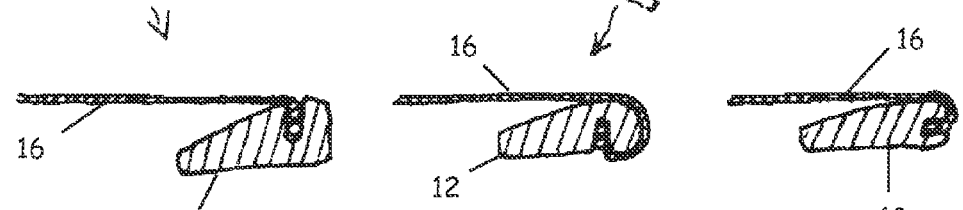
FIG. 31D

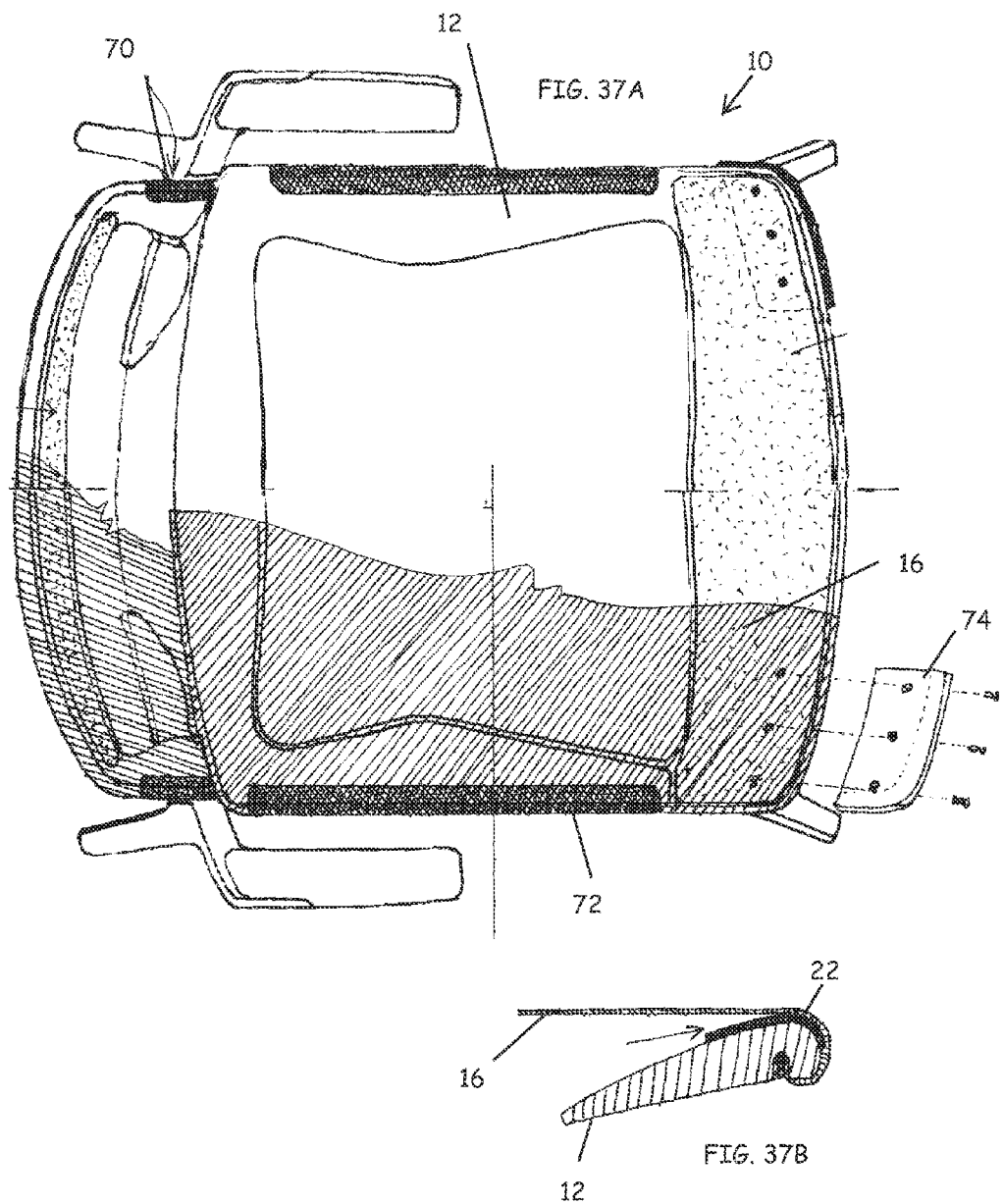

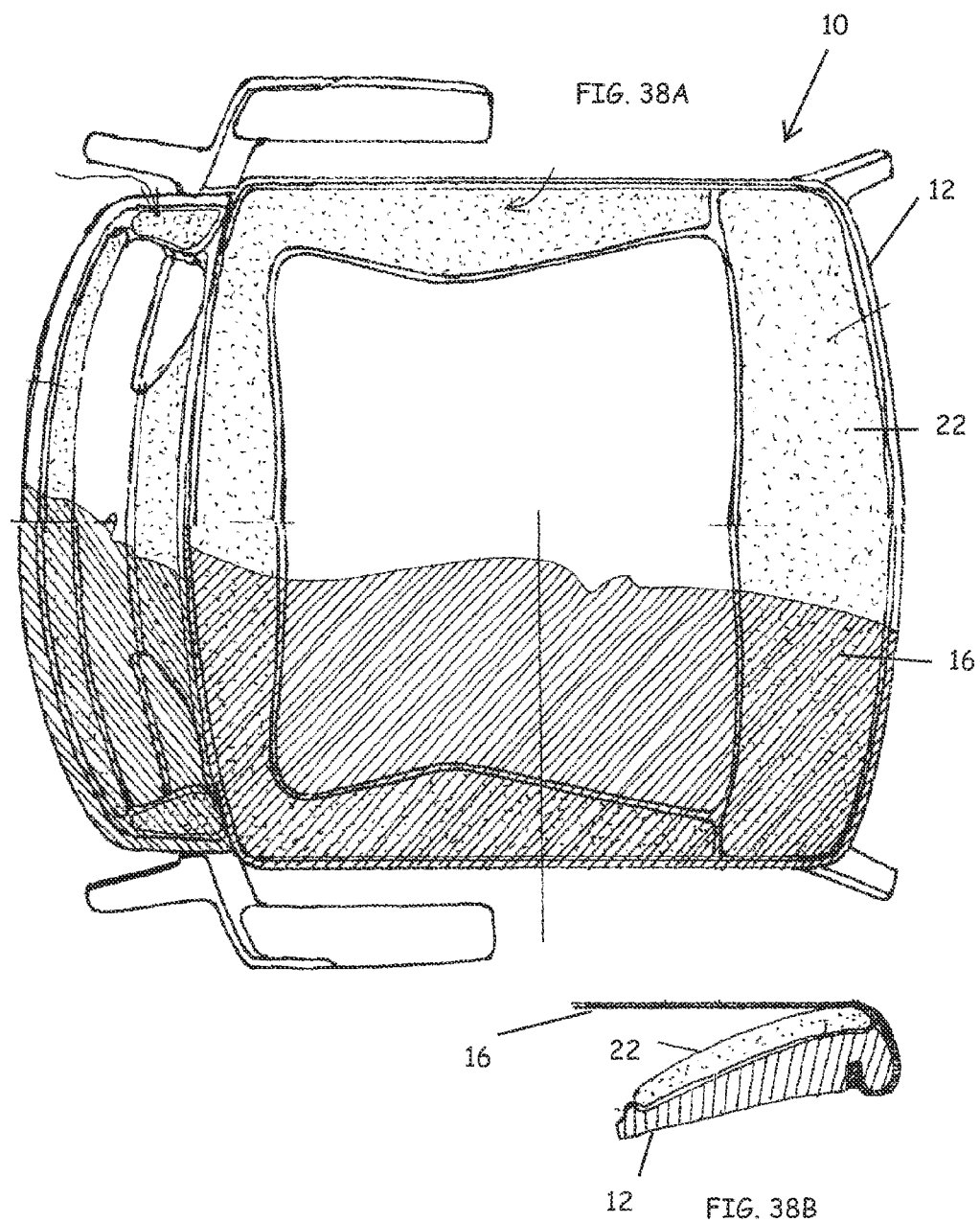

METHODS AND ARRANGEMENTS FOR SECURING FABRIC

PRIORITY INFORMATION

Continuation-in-part of application Ser. No. 11/835,366, filed Aug. 7, 2007, which was a continuation of application Ser. No. 10/868,370, filed Jun. 14, 2004, which claimed priority to Provisional Application No. 60/478,181, filed Jun. 11, 2003

FIELD OF THE INVENTION

The present invention relates generally to fabric application systems and methods. More particularly, disclosed and protected herein are certain methods and arrangements for securing fabric in place, such as relative to a frame or the like.

BACKGROUND OF THE INVENTION

In traditional upholstered furniture construction, a layer of fabric, commonly referred to as any "A" layer, is retained relative to a frame structure overlying one or more subsurface layers, commonly referred to as "B", "C", and possibly further layers. The subsurface layers, which can comprise additional fabric layers, foam layers, springs, bands, and the like, generally provide continuous support to the "A" layer. As such, the "A" layer itself need only be attached to the frame structure; it need not provide substantial support. With this, attachment methods for "A" layers in such structures commonly involve simple stapling, adhering, or the like.

More recently, furniture constructions have been developed wherein one or more panels of fabric span a framework with no central support. Commonly, the fabric comprises an elastomeric material, such as an elastomeric mesh material. Since the fabric panel acts as the sole means of support to furniture occupants and the like, the peripheral edges of the fabric panel must be attached particularly securely.

Attempting that that secure attachment presents unique challenges to the furniture maker. This is particularly the case relative to elastomeric materials and especially so relative to elastomeric mesh materials. For example, for optimal appearance and performance, elastomeric materials normally must be pretensioned and secured in place while maintaining that pretensioning.

Additionally, since elastomeric material, particularly elastomeric mesh, is formed by numerous individual elastomeric filaments, continuous support must be provided over substantially the entire periphery of the fabric panel to ensure that each elastomeric filament is fixedly retained. Even further still, it can be desirable to provide different support characteristics relative to different areas of the panel of elastomeric material, which may demand a variable pattern of pretensioning, thereby further complicating the attachment process.

Prior art methods and structures have struggled in seeking to confront the aforementioned and further challenges of retaining a fabric panel. Certain structures have proven to be undesirably complex and expensive in structure and manufacture. Other methods and structures have failed to provide adequate retention of the fabric panel. Still further, particularly since the fabric panel acts as the sole means of support to furniture occupants and the like, it has been found that many prior art attachment arrangements have left the fabric panel and the edges thereof disadvantageously vulnerable to dislodging, damage, and tampering.

These and further disadvantages have frustrated the ability of elastomeric material structures from achieving widespread availability and commercial success. As a result, it is clear that there remains a discernable need for methods and arrangements for retaining fabric relative to a framework in a secure manner that meets the needs and overcomes the disadvantages that have been left by the prior art.

SUMMARY OF THE INVENTION

Advantageously, the present invention is founded on a basic object of overcoming the disadvantages suffered by the prior art while providing a number of previously unrealized advantages thereover.

A more particular object of embodiments of the invention is to provide an arrangement for retaining fabric relative to a framework in a secure manner.

A related object of embodiments of the invention is to provide an arrangement for retaining fabric relative to a framework that provides substantially continuous support over at least a portion of a periphery of a fabric panel to provide a reliable retention of individual fibers forming the fabric panel.

Another object of particular embodiments of the invention is to provide a method and arrangement for retaining fabric relative to a framework that permits and maintains a selective pretensioning of the fabric, including with a variable pretensioning pattern.

Still another object of certain embodiments of the invention is to provide a method and arrangement for retaining a panel of fabric relative to a framework that resists damage to the panel of fabric.

An even further object of embodiments of the invention is to provide a method and arrangement for retaining a fabric panel relative to a framework that inhibits tampering with the attachment of the fabric panel.

A more particular object of embodiments of the invention is to provide a method and arrangement for retaining a fabric panel relative to a framework that provides evidence of tampering.

Yet another object of the invention is to provide a method and arrangement for retaining a fabric panel relative to a framework that is efficient in construction and manufacture such that a resulting structure can be made and sold in a cost effective manner.

These and in all likelihood further objects and advantages of the present invention will become obvious not only to one who reviews the present specification and drawings but also to those who experience an embodiment of the methods and arrangements for securing fabric disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

One will appreciate that the present discussion broadly outlines the more important goals of the invention to enable a better understanding of the detailed description that follows and to instill a better appreciation of the inventor's contribution to the art. Before any particular embodiment or aspect thereof is explained in detail, it must be made clear that the following details of construction, descriptions of hardware and software designs, and illustrations of inventive concepts are mere examples of the many possible manifestations of the invention.

BRIEF DESCRIPTION OF THE DRAWINGS

In the accompanying drawing figures:

FIG. 1A is a sectioned view in side elevation of a frame structure according to the present invention;

FIG. 1B comprises sectioned, portioned top and bottom plan views of the frame structure of FIG. 1A;

FIG. 1C is a sectioned view in front elevation of the frame structure of FIG. 1A;

FIG. 1D is a partially sectioned view in front elevation of the frame structure of FIG. 1A;

FIG. 2A is a sectioned view in side elevation of an alternative frame structure according to the present invention;

FIG. 2B comprises sectioned, portioned top and bottom plan views of the frame structure of FIG. 2A;

FIG. 2C is a sectioned view in front elevation of the frame structure of FIG. 2A;

FIG. 2D is a partially sectioned view in front elevation of the frame structure of FIG. 2A;

FIG. 3A is a sectioned view in side elevation of another alternative frame structure according to the present invention;

FIG. 3B comprises sectioned, portioned top and bottom plan views of the frame structure of FIG. 3A;

FIG. 3C is a sectioned view in front elevation of the frame structure of FIG. 3A;

FIG. 3D is a partially sectioned view in front elevation of the frame structure of FIG. 3A;

FIG. 4A is a sectioned view in side elevation of still another alternative frame structure according to the present invention;

FIG. 4B comprises sectioned, portioned top and bottom plan views of the frame structure of FIG. 4A;

FIG. 4C is a sectioned view in front elevation of the frame structure of FIG. 4A;

FIG. 4D is a partially sectioned view in front elevation of the frame structure of FIG. 4A;

FIG. 5A is a sectioned view in side elevation of a further frame structure;

FIG. 5B comprises sectioned, portioned top and bottom plan views of the frame structure of FIG. 5A;

FIG. 5C is a sectioned view in front elevation of the frame structure of FIG. 5A in a given stage of production;

FIG. 5D is a sectioned view in front elevation of the frame structure of FIG. 5A in a later stage of production;

FIG. 5E is a partially sectioned view in front elevation of the frame structure of FIG. 5A;

FIG. 6A is a sectioned view in side elevation of another frame structure pursuant to the present invention;

FIG. 6B comprises sectioned, portioned top and bottom plan views of the frame structure of FIG. 6A;

FIG. 6C is a sectioned view in front elevation of the frame structure of FIG. 6A;

FIG. 7A is a sectioned view in side elevation of a further frame structure according to the present invention;

FIG. 7B comprises sectioned, portioned top and bottom plan views of the frame structure of FIG. 7A;

FIG. 7C is a sectioned view in front elevation of the frame structure of FIG. 7A;

FIG. 9A is a sectioned view in side elevation of a further frame structure;

FIG. 9B comprises sectioned, portioned top and bottom plan views of the frame structure of FIG. 9A;

FIG. 10A is a sectioned view in side elevation of still another frame structure as disclosed herein;

FIG. 10B comprises sectioned, portioned top and bottom plan views of the frame structure of FIG. 10A;

FIG. 10C is a sectioned view in front elevation of the frame structure of FIG. 10A;

FIG. 11A is a sectioned view in side elevation of a further frame structure pursuant to the instant invention;

FIG. 11B comprises sectioned, portioned top and bottom plan views of the frame structure of FIG. 11A;

FIG. 11C is a sectioned view in front elevation of the frame structure of FIG. 11A;

FIG. 12A is a sectioned view in front elevation of a portion of another frame structure as disclosed herein in a given stage of manufacture;

FIGS. 12B, 12C, and 12D are views in side elevation of locking splines pursuant to the present invention;

FIG. 12E is a sectioned view in front elevation of the portion of frame structure of FIG. 12A in a later stage of manufacture;

FIG. 12F is a view in front elevation of a locking spline under the present invention;

FIG. 13A is a sectioned view in front elevation of an even further frame structure pursuant to the invention disclosed herein in a given stage of manufacture;

FIG. 13B is a sectioned view in front elevation of the frame structure of FIG. 13A in a later stage of manufacture;

FIG. 14A is a sectioned view in front elevation of an additional frame structure under the present invention in a given stage of manufacture;

FIG. 14B is a sectioned view in front elevation of the frame structure of FIG. 14A in a later stage of manufacture;

FIG. 14C depicts views in side elevation of alternative locking splines pursuant to the present invention;

FIG. 15A is a sectioned view in front elevation of another frame structure according to the present invention in a given stage of manufacture;

FIG. 15B is a sectioned view in front elevation of the frame structure of FIG. 15A in a later stage of manufacture;

FIG. 15C depicts views in side elevation of further locking splines pursuant to the present invention;

FIG. 23 is a cross sectional view of an alternative locking spline according to the invention disclosed herein;

FIG. 24 is a cross sectional view of a frame structure employing the locking spline of FIG. 23;

FIG. 25 is a cross sectional view of another frame structure and locking spline arrangement;

FIG. 31A is a partially sectioned view in front elevation a flexible frame structure as taught herein;

FIGS. 31B and 31C respectively are views in left elevation and top plan of the flexible frame structure in varying degrees of flex;

FIG. 31D provides cross sectional views of varied material retention configurations;

FIG. 37A is a partially sectioned top plan view of a task chair as taught herein;

FIG. 37B is a cross sectional view of a portion of the frame structure of FIG. 37A;

FIG. 38A is a partially sectioned top plan view of a further task chair as taught herein; and FIG. 38B is a cross sectional view of a portion of the frame structure of FIG. 38A.

DETAILED DESCRIPTION OF PREFERRED EMBODIMENTS

Figure 8A:
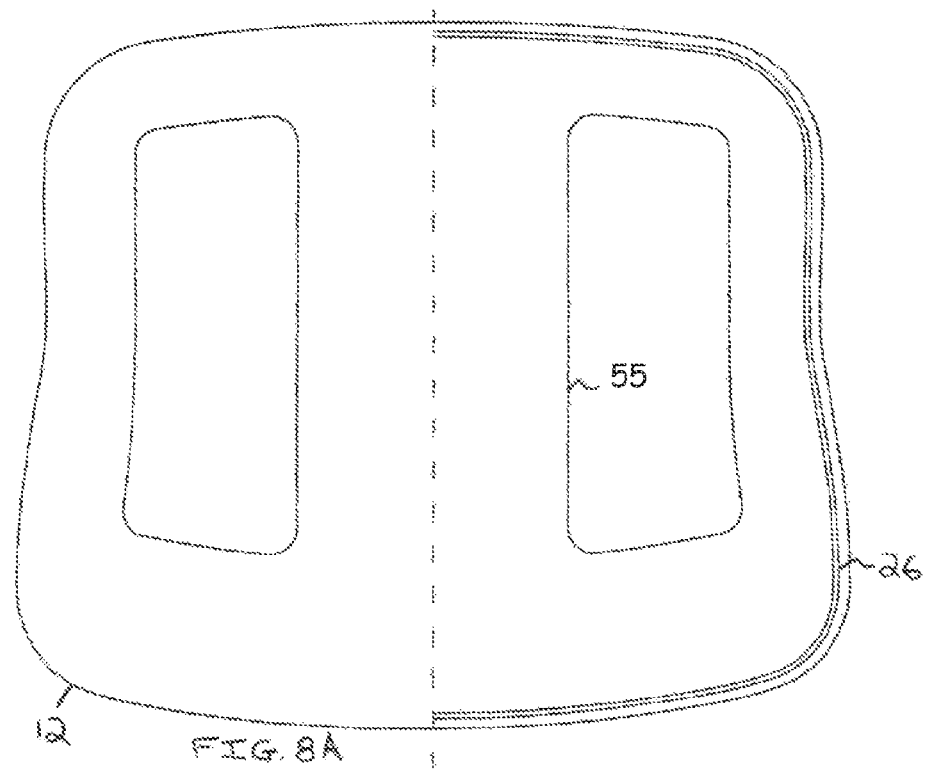
FIG. 8A comprises sectioned, portioned top and bottom plan views of an even further frame structure.

As is the case with many inventions, the methods and arrangements for retaining a fabric panel relative to a framework disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

In considering the present invention, it will be appreciated that the fabric referenced herein could be substantially any type of pliable material that could be made by any method. In some cases, the fabric can comprise a mesh material. In further cases, the fabric can be an elastomeric material. In still further cases, the fabric can be an elastomeric mesh. The structure to which the fabric is secured can also vary widely. The structure could, by way of example, be a framework, such as a framework for a component of an article of furniture or any other type of framework.

Looking more particularly to the drawings, an example of a frame structure taking advantage of the present invention is indicated generally at 10 in FIGS. 1A through 1D. The frame structure 10 is founded on a framework 12 that can be made from any appropriate material, including plastic, metal, wood, or a combination thereof. The framework 12 in this example is generally rectangular and is designed for use as a seat bottom. In FIG. 1A, the frame structure 10 is shown in lateral cross section while it is shown in longitudinal cross section in FIG. 1C. In FIG. 1B, the frame structure 10 is shown in partially sectioned top and bottom plan views, and the frame structure 10 is shown in a partially sectioned view in front elevation in FIG. 1D.

The framework 12 has a groove 26 that circumscribes its entire periphery. In this embodiment, the framework 12 has what can be considered an obverse side capable of providing support, a peripheral edge, and a reverse side. The groove 26 in this embodiment is disposed in the reverse side of the framework 12. A fabric panel 16 is secured in place relative to the framework 12 by a locking spline 18 that is disposed in the groove 26 such that there is a mutual frictional engagement between the locking spline 18, the walls of the groove 26, and the portion of the fabric panel 16 interposed therebetween. Under this arrangement, the fabric panel 16 exits the groove 26, reverses over the peripheral edge of the framework 12, and traverses the open area of the framework 12.

In this example, the groove 26 is generally U-shaped. The locking spline 18 has a proximal portion that also is U-shaped and a wedge-shaped distal portion. The locking spline 18 in this embodiment is formed from a resiliently compressible material, such as rubber, plastic, or any other suitable material or combination thereof. The locking spline 18 can be pressed, driven, injected, shot, or otherwise inserted into the groove 26 to achieve the desired frictional engagement of the groove 26 and the desired retaining of the fabric panel 16. The locking spline 18 can include a relief portion 30, which in this example comprises an open volume in a central portion of the locking spline 18. The relief portion 30 facilitates the resilient compression of the locking spline 18. The relief portion 30 also assists in locking the locking spline 18 and the fabric panel 16 in place relative to the groove 26.

In certain embodiments, the locking spline 18 could be formed from a material composition calibrated to cause it to harden over time to cause it to become further fixed in place within the groove 26. With proper material selection and, possibly, proper packaging and handling, the locking spline 18 itself could be soft and pliable upon initial application and then could harden over time thereby fixedly locking the locking spline 18 and the fabric panel 16 in place.

In certain cases, the locking spline 18 could be generally homogenous. In other embodiments, the locking spline 18 could be formed from disparate materials. The disparate materials could be chosen to induce a hardening of one or both materials under appropriate conditions, such as upon exposure to air, heating, mixing, and/or any other effective method. In any such case, the locking spline 18 could be considered to be formed from a phase change material in that the locking spline 18 would initially be in a relatively soft and pliable condition but would then change in phase to a relatively hard and rigid condition.

One example of an embodiment wherein disparate materials can form the locking spline 18 is depicted in FIGS. 23 and 24. There, the locking spline 18 has a star shaped core member 18B enveloped within a corrugated, generally annular sheath member 18A. In FIG. 23, the locking spline 18 is shown in relation to an insertion member 200, which can press the locking spline 18 into the groove 26. The materials of the sheath member 18A and the core member 18B are chosen to induce one or both of them to harden, such as after a mixing as is shown in FIG. 24, induced by a pressing of the insertion member 200. The sheath member 18A and the core member 18B could be maintained substantially or completely separately from one another prior to mixing by any suitable means, including by a film disposed therebetween or by their own configurations. As previously described, the groove 26 can have a raised inner wall to enable a trimming of the fabric panel 16, such as by a cutting member 300.

In any case, the hardening of the locking spline 18 after the insertion thereof into the groove 26 can be advantageous for a plurality of reasons. For example, a hardened locking spline 18 will resist becoming dislodged, whether due to tampering, impact forces, static forces, or any other influence. Furthermore, where the locking spline 18 has become hardened, it will provide evidence of tampering in that the locking spline 18 would have to be damaged or destroyed with deliberate or extreme force to be removed from the groove 26.

In particular embodiments, the locking spline 18 could be further locked in place by a secondary locking means 25. The secondary locking material 25 could take a variety of forms. In the example of FIG. 25, the secondary locking material 25 comprises a material that can be applied in flowable form and that hardens once in place. As such, the secondary locking material 25 could comprise an adhesive, a chemical hardening agent that induces a hardening of itself and/or the locking spline 18, or any other effective means. In the example of FIG. 25, a modesty member 28 has been partially embedded in the secondary locking material 25. Under this arrangement, the fabric panel 16 is retained over a span substantially greater than 180 degrees.

A resiliently compressible member 14, which can be formed from foam, rubber, or any other suitable material or combination thereof, is interposed between the fabric panel 16 and the framework 12 adjacent to what may be considered a front edge of the frame structure 10. As FIG. 1A shows most clearly, the resiliently compressible member 14 provides a smooth, curved upper surface over which the fabric panel 16 can travel to provide a comfortable, curved or "waterfall" support surface for a user. Looking to FIG. 1D, one sees that the resiliently compressible member 14 has a plurality of furrows 24 formed therein for facilitating a compression of the resiliently compressible member 14.

Where the fabric panel 16 overlies the exposed edges of the framework 12, it may be necessary or desirable to provide a means for preventing or limiting damage to the fabric panel 16, such as might otherwise result from impacts between the frame structure 10 and an external structure (not shown). One such means is shown in FIGS. 1A through 1C in the form of an interior impact absorbing member 22 that underlies the fabric panel 16 along the forward exposed edge portion of the framework 12. The interior impact absorbing member 22 is formed from a compressible, preferably resiliently compressible, material. As a result, in the event of an impact between the exposed edge of the framework 12 and an external structure, the impact would be absorbed and distributed by the interior impact absorbing member 22 thereby preventing crushing and damage to the fabric panel 16.

An alternative or additional means for preventing or limiting damage to the fabric panel 16 is also shown in FIGS. 1A and 1B in the form of an exterior bumper 20. The exterior bumper 20 could be formed from any appropriate material, including plastic, metal, wood, or any other suitable material. The exterior bumper 20 is secured in place overlying the exposed edge of the framework 12 and over the fabric panel 16. When so configured, the exterior bumper 20 protects the fabric panel 16 from impact and other damage.

Similarly, as shown in FIGS. 35, 36, 37A, and 37B, bumpers 70, 72, and 74 can be disposed to permit a stacking of multiple chair frame structures 10A and 10B while preventing damage to the fabric panels 16 retained thereon. For example, it has been found to be advantageous to have a rear bumper 70 disposed posterior to the back frame structure of a stacking chair, a rearward bottom bumper 72 disposed below the seat frame structure of the stacking chair to the posterior portion of the seat, and a forward bottom bumper 74 disposed below the seat frame structure of the stacking chair toward the anterior portion of the seat. With each bumper 70, 72, and 74 being cushioned or otherwise resilient, damage to the fabric panel 16 can be prevented. The bumpers 70, 72, and 74 can be integrally formed or secured in place in any suitable manner. As seen in FIG. 37B and FIGS. 38A and 38B, an impact absorbing member 22 can additionally be employed.

As FIGS. 2A through 2D show, the groove 26 can alternatively be disposed along the peripheral edge of the framework 12 for receiving the locking spline 18. Where the locking spline 18 and the groove 26 are exposed to view, a modesty member 28, such as a cord or the like, can overly the locking spline 18 within the groove 26. In such an embodiment, the fabric panel 16 will again traverse at least part of the peripheral edge of the framework 12 and, therefore, may need a means for protecting it from crushing and other damage. That means could again comprise an exterior bumper 20, an interior impact absorbing member 22, or any other suitable means.

The assembly method and resulting frame structure can further be embodied as depicted in the progressive representations of FIGS. 27 through 30. There, the framework 12 again has a groove 26 of a given width C. A layer of adhesive 64 is disposed at the base of the groove 26 for securing the fabric panel 16 and the locking spline 18, which has a width B, in a firm and stable manner while advantageously permitting the framework 12 to flex and bend in a manner often not realized under prior art constructions. The locking spline 18 is flexible with deep, extruded or otherwise formed channels communicating longitudinally therealong for permitting improved gripping of the fabric panel 16. With that, the adhesive 64 is pressed through the fibers of the fabric panel 16 and into the channels in the locking spline 18. The locking spline 18, the fabric panel 16, and the adhesive 64 thus cooperate to form a secure retention combination while permitting a flexing of the framework 12 during use.

Figure 28:
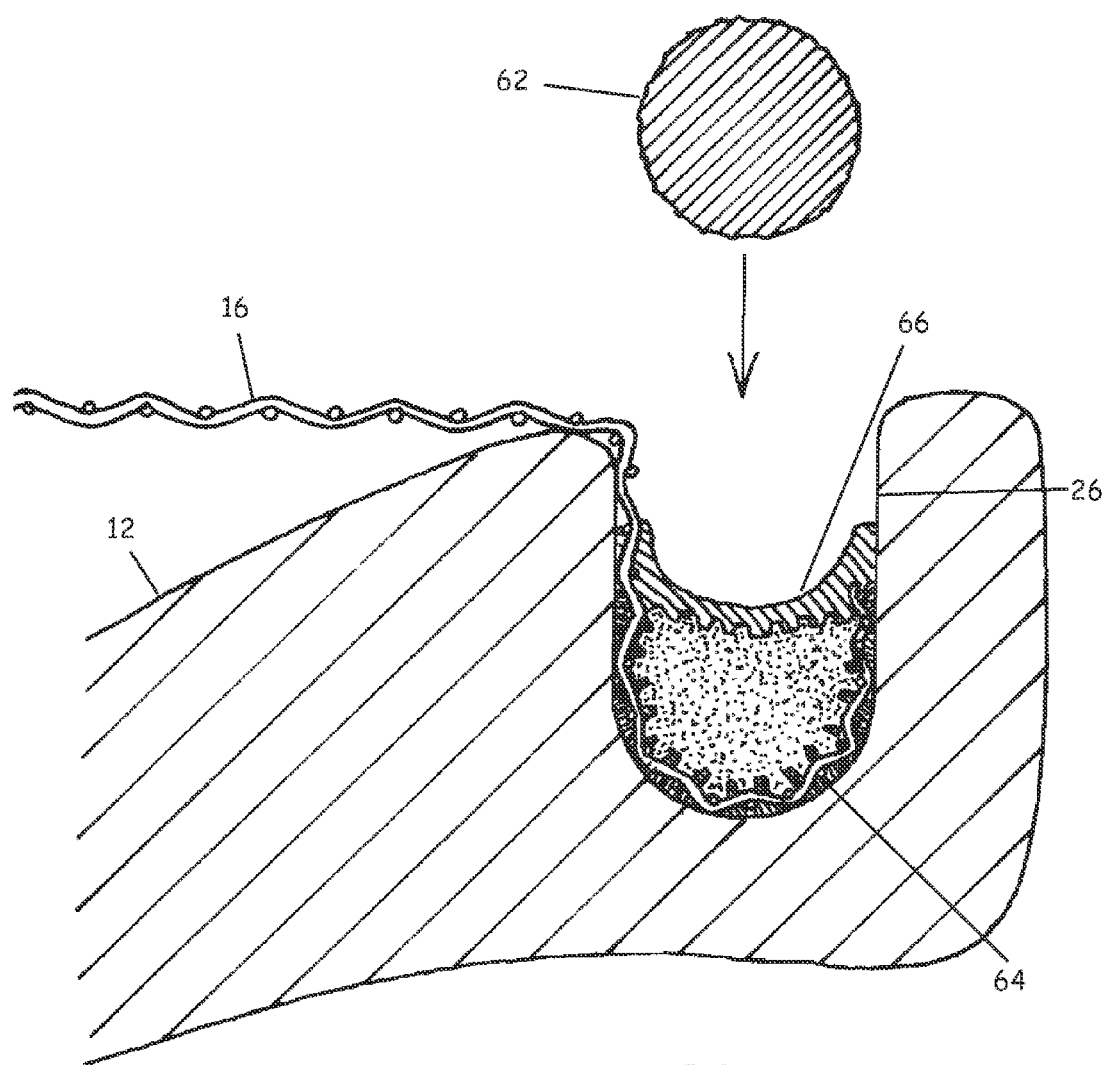
FIG. 28 is a cross sectional view of the frame structure and locking spline arrangement of FIG. 27 in a secondary stage of assembly.

As shown in FIG. 28, a safety sealant 66 is applied to cover the locking spline 18 and the outboard edge of the fabric panel 16, which has been trimmed or otherwise disposed to terminate within the groove 26. The safety sealant 66 thus locks the fabric panel 16 and the locking spline 18 in place. Finally, an elongate safety cord 62, which has a width a is applied atop the locking spline 18 and retained in place by the safety sealant 66 and, additionally or alternatively, a frictional and mechanical engagement with the groove 26, the fabric panel 16, the safety sealant 66, and the fabric panel 16. The safety cord 62 has a tamper-evident surface, such as by being formed from a frangible material that can be permanently chipped, scarred, or otherwise marred by impacts thereupon. As a result, should the structure be misused with impact on the safety cord 62 or should a person deliberately attempt to tamper with the retention arrangement, the safety cord 62 will provide permanent evidence thereof through permanent marring. For example, should a person attempt to pry the safety cord 62 and the spline 18 out of the groove with a screwdriver or other tool 500 as in FIG. 30, proof of that attempted tampering will be provided by the chipped or otherwise damaged safety cord 62.

Figure 29:
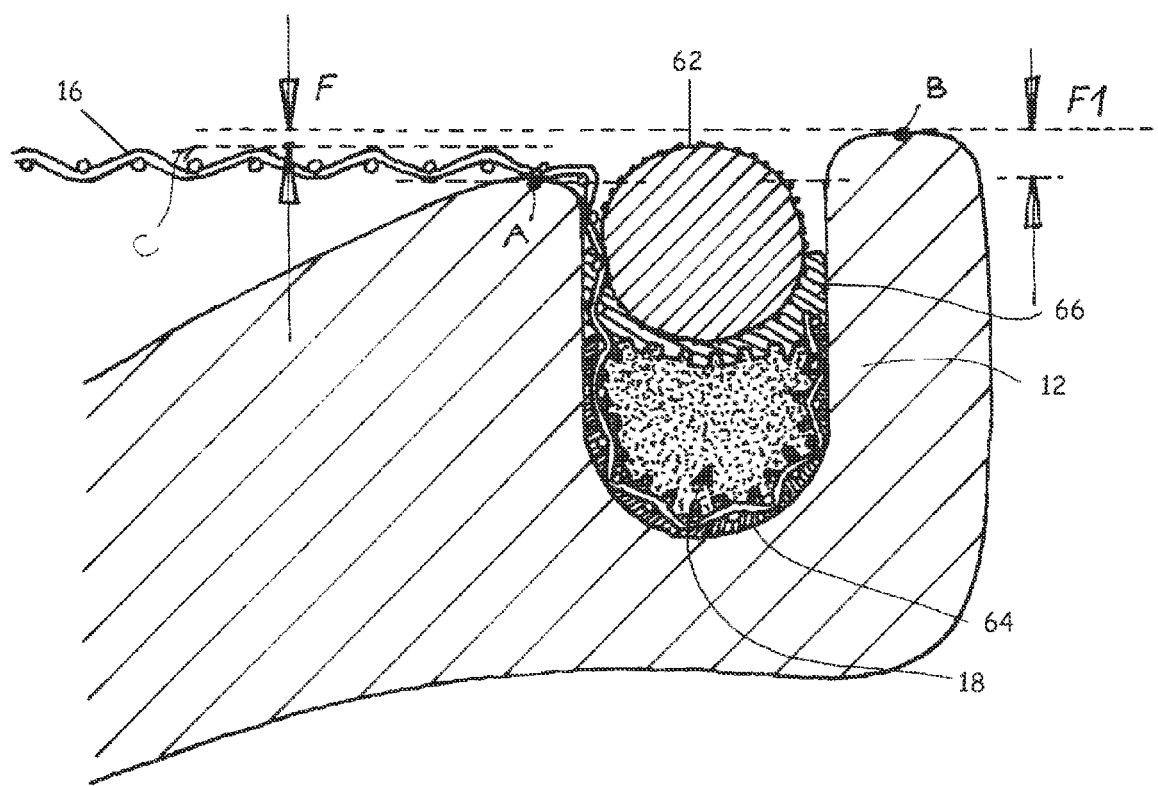
FIG. 29 is a cross sectional view of the frame structure and locking spline arrangement of FIG. 27 in a further stage of assembly.
Figure 30:
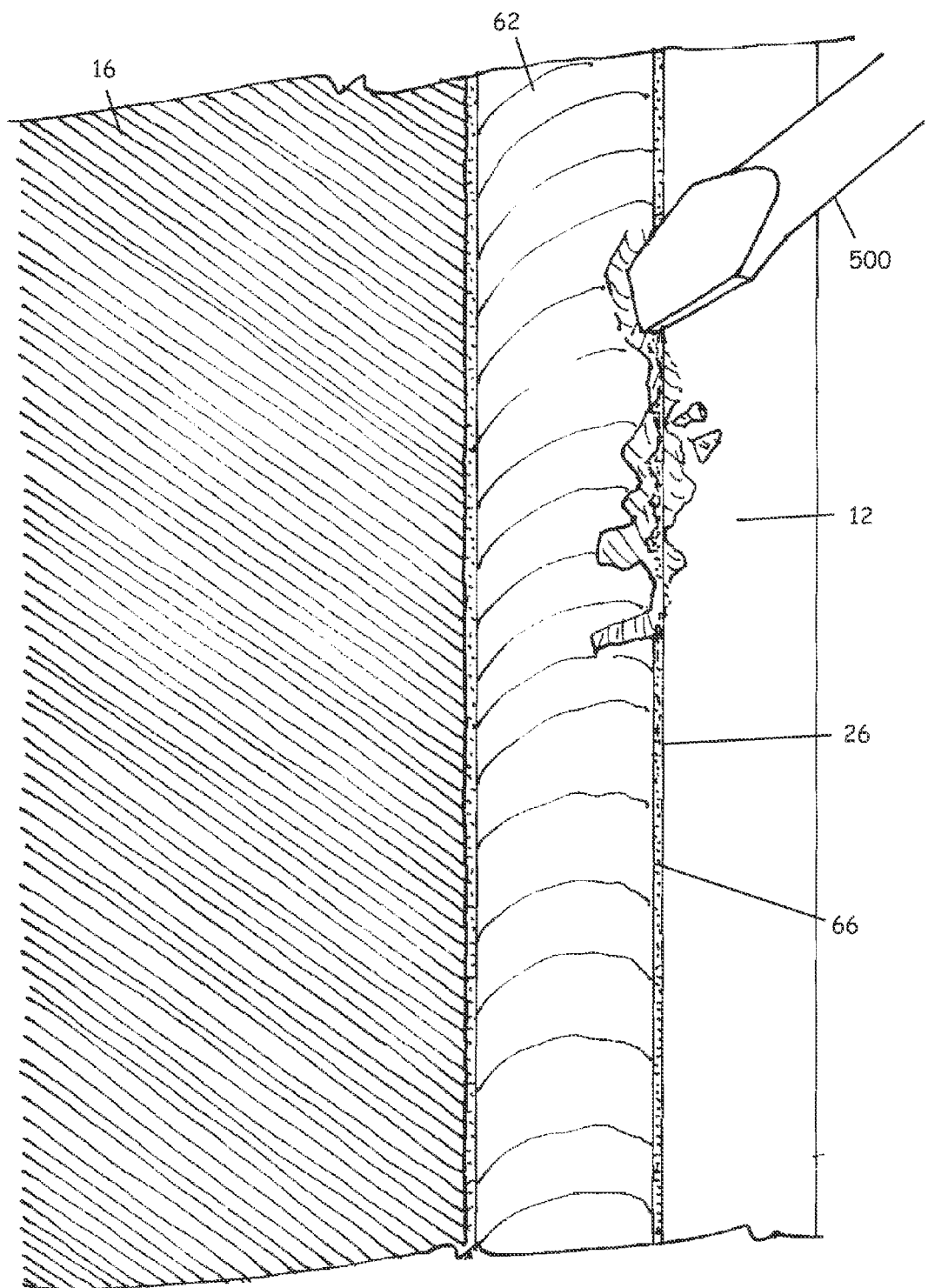
FIG. 30 is a perspective view of the frame structure and locking spline arrangement of FIG. 30 in use resisting damage thereto.

Advantageously, however, the secured retention arrangement formed as shown in FIG. 29 can bend and twist without a risk of the fabric panel 16 dislodging. For example, one may have reference to FIGS. 31A through 31D. There, the framework 12 is shown to be flexed and twisted while the fabric panel 16 is securely retained. The framework 12 can vary in cross section and groove location to permit flexing while preventing damage to the fabric panel 16.

Figure 32A:
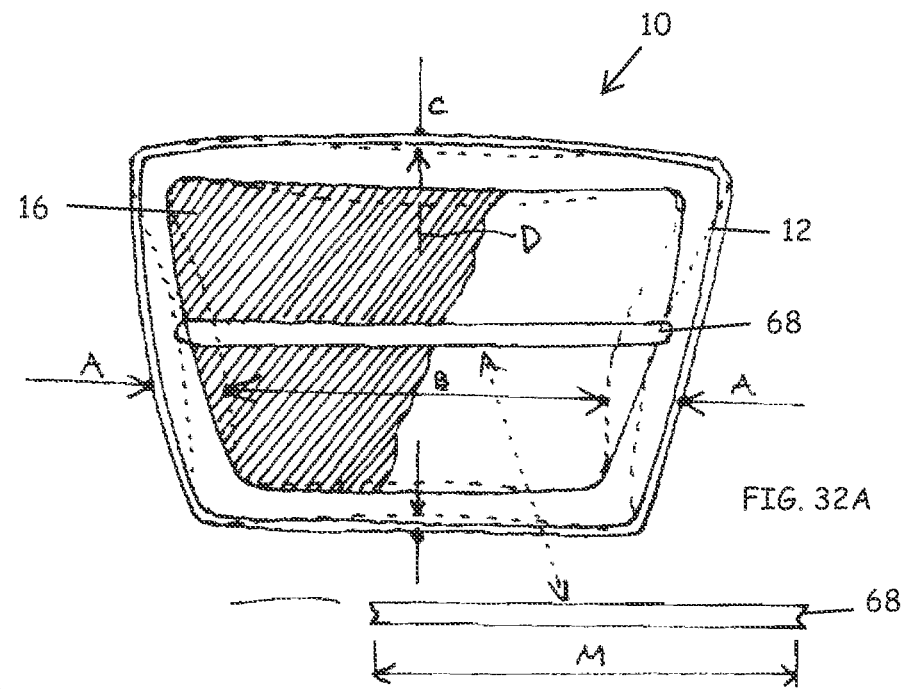
FIGS. 32A and 32B are partially sectioned elevational views of frame structures with a stabilizing bar retained relative thereto.
Figure 32B:
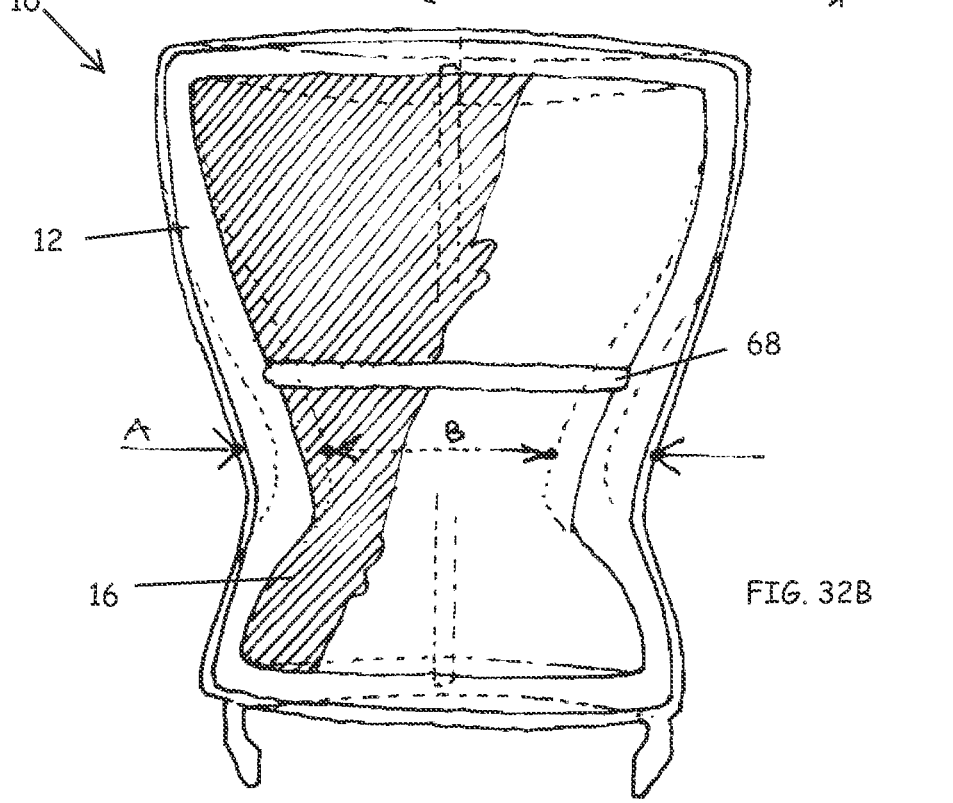

In constructing frame structures 10 as taught herein, the present inventor has realized that, where the material and configuration of the framework 12 are designed to permit flexing, the initial installation of the fabric material 16, which is under tension as described herein, can often trigger a deformation of the framework 12 before the framework 12 is fastened to a broader construction, such as the body of a task chair. Bearing in mind that frame structures 12 may need to be stored prior to assembly for weeks and months with fabric panels 16 retained thereon, it has been found to be advantageous to install one or more temporary stabilizer bars 68 as illustrated in FIGS. 32A and 32B. There, the stabilizer bar 68 has a length M corresponding to the proper distance between opposed sections of the framework 12. For example, the stabilizer bar 68 can have grooved ends for positively engaging and being interposed between opposed sections of the framework 12. Alternatively, the stabilizer bar 68 could be overlap the sections of the framework 12 and be secured by any effective means. The stabilizer bar 68 will prevent deflection of the framework 12 until the completion of assembly, and the bar 68 can then be removed.

As FIG. 2C shows most clearly, the fabric panel 16 could alternatively or additionally be protected against damage by having what may be considered the upper peripheral edge of the groove 26 recessed by a distance R relative to the lower peripheral edge of the groove 26. Under such an arrangement, most impacts between the framework 12 and an external structure will be met by the lower edge of the groove 26 while the fabric panel 16 overlying the upper edge of the groove 26 will be shielded by the lower edge of the groove 26 and, therefore, protected.

Figures 33A, 33B:
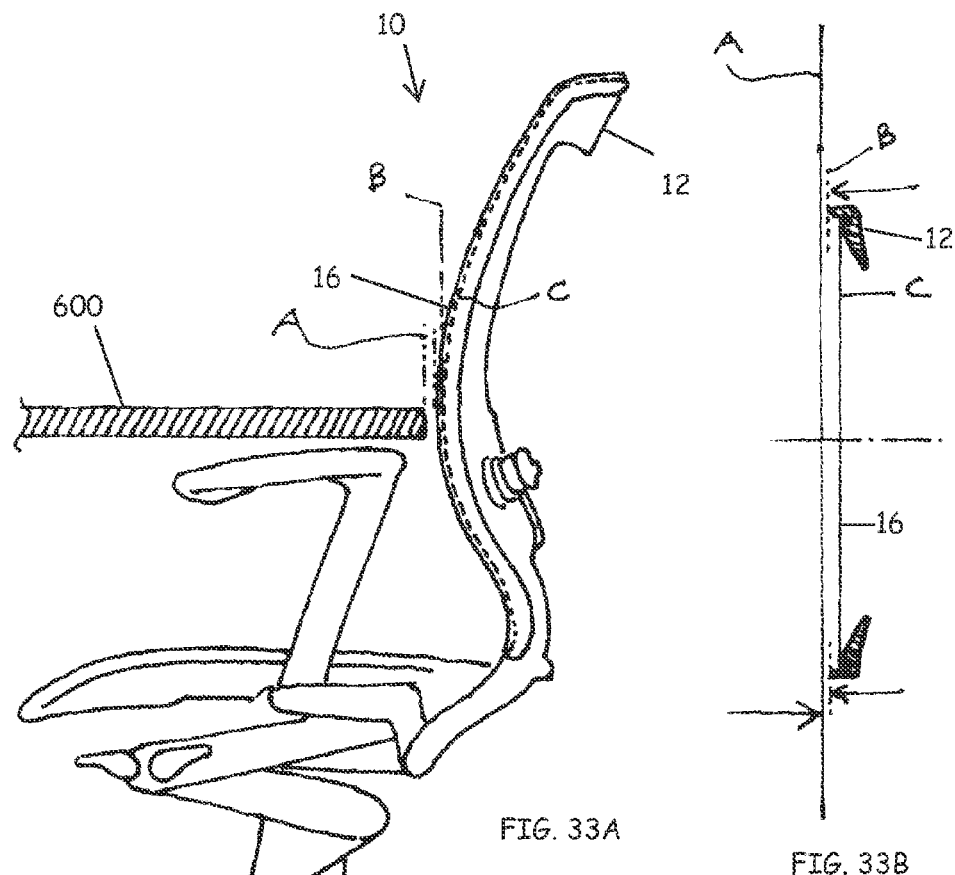
FIGS. 33A and 33B respectively are views in side elevation and lateral cross section of a frame structure as taught herein embodied in a task chair.

Similarly, looking again to FIG. 29, point B of the framework 12 to the outboard side of the groove 26 extends beyond point A to the inboard side of the groove 26 over which the fabric panel 16 lies. With that, the fabric panel 16 again tends to be protected against direct impacts. With that, a frame structure 10, such as a chair as in FIG. 33A, can be used in relation to a table 600 or similar surface with limited risk of damage to the fabric panel 16. As seen in the cross sectional view of FIG. 33B, the outboard portions of the framework 12 extending beyond the fabric panel 16 will make contact with a surface to prevent damage to the fabric panel 16.

Figure 34:
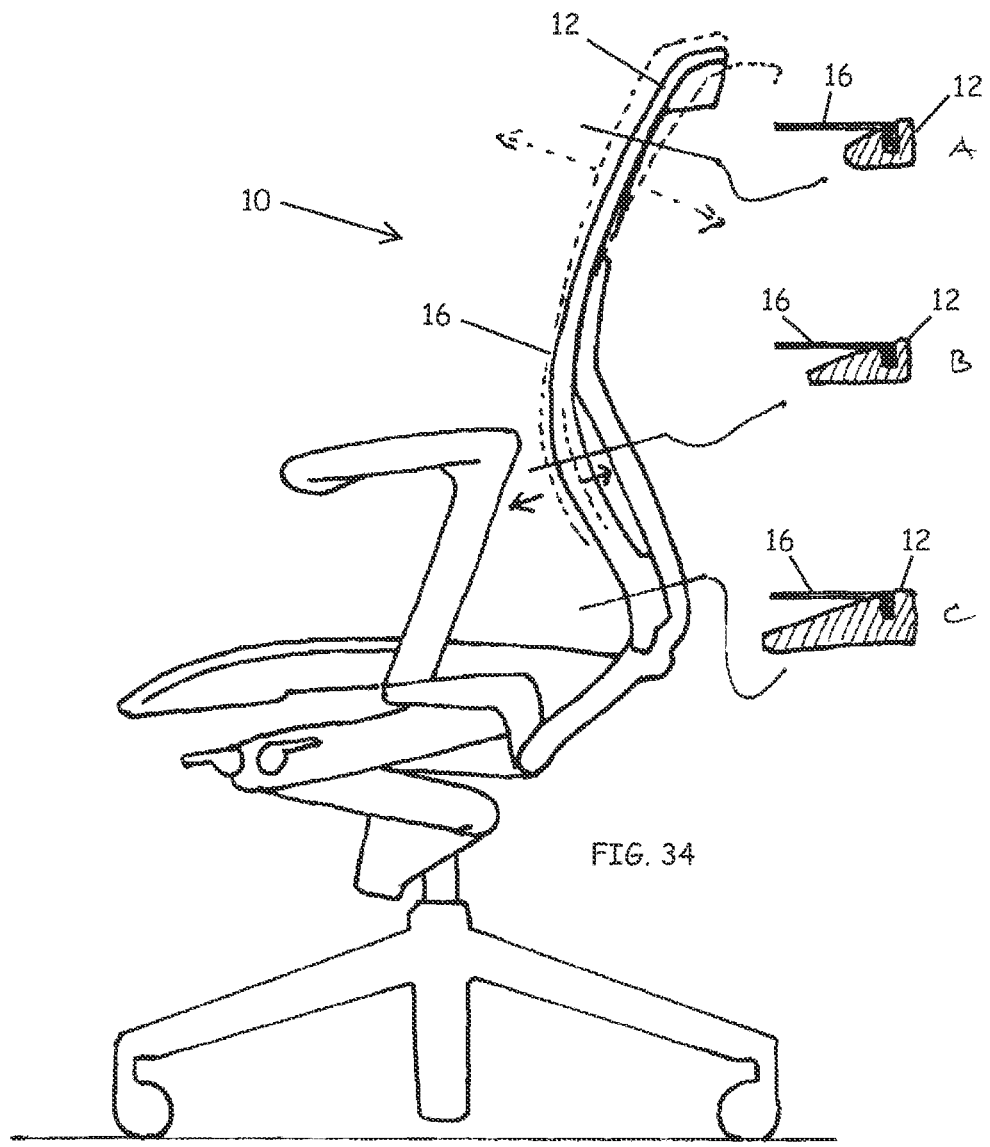
FIG. 34 is a view in side elevation of a frame structure as taught herein embodied in a task chair with cross sectional views of the frame structure at varying points.
Figure 35:
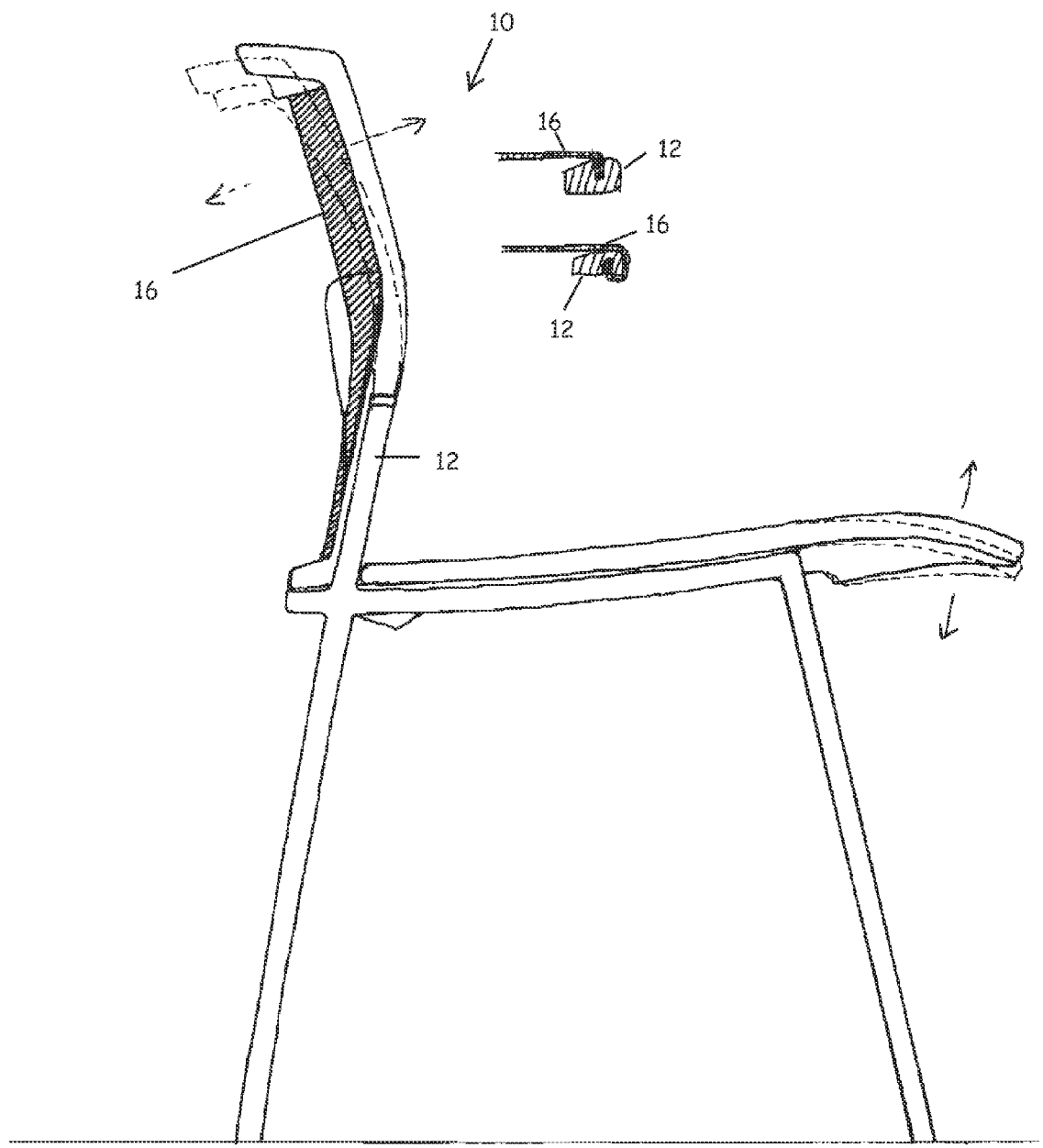
FIG. 35 is a view in side elevation of a frame structure as taught herein embodied in a conference chair.
Figure 36:
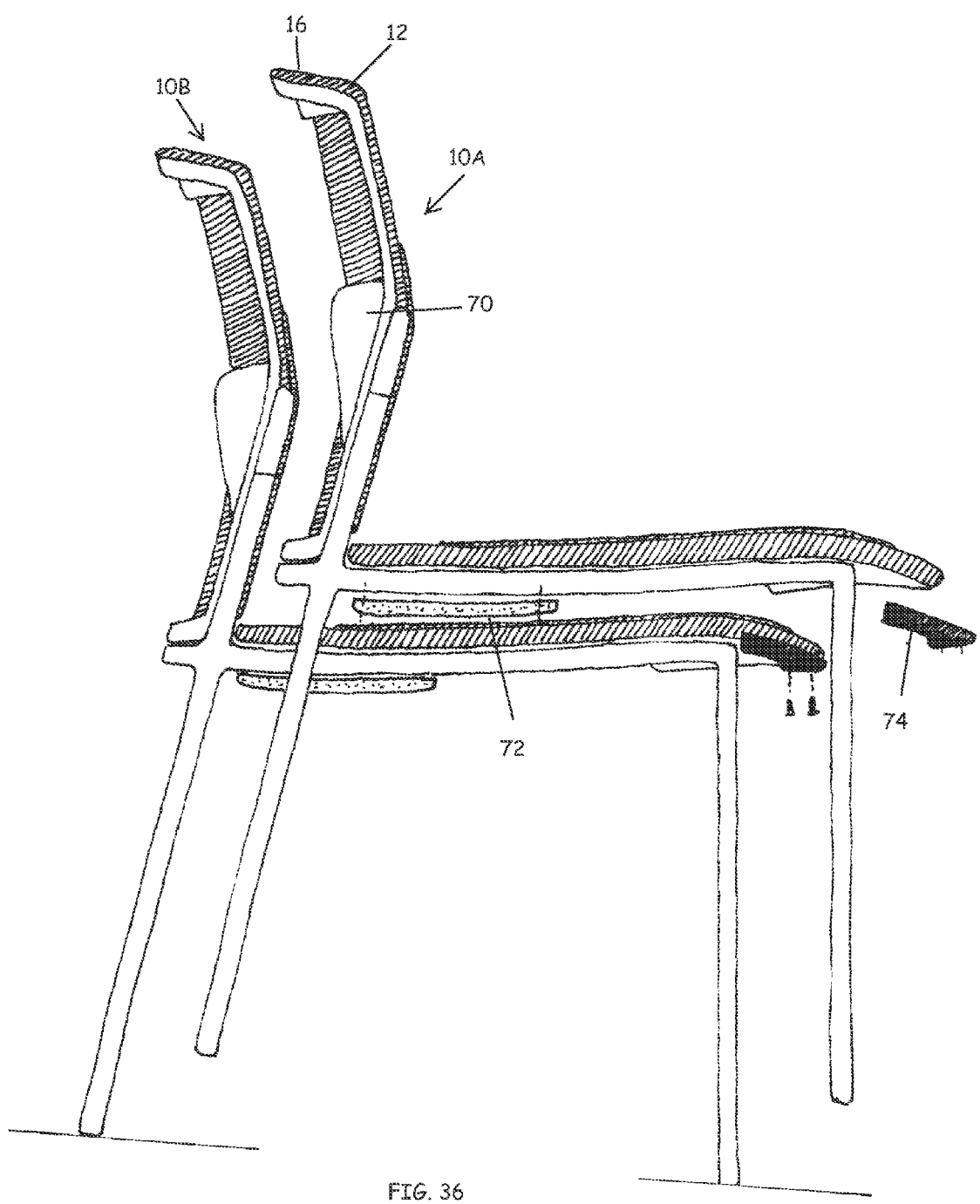
FIG. 36 is a view in side elevation of first and second conference chairs in a stacked configuration.

As illustrated in FIG. 34, for example, frameworks 12 pursuant to the invention are crafted for use with task chairs and are engineered with different cross sections to permit desired flexing while providing necessary support to a human occupant. The disposition of the retention location of the fabric panel 16 relative to the framework 12 can vary to support the load of a human body in an ergonomic manner while permitting satisfactory flexing of the structure.

As FIGS. 3A through 3D show, the groove 26 could alternatively be disposed to the obverse side of the framework 12. In such a construction, means for protecting the fabric panel 16 would in all likelihood no longer be necessary. A modesty member 28 can again be inserted into the groove 26 distal to the locking spline 18 for shielding the locking spline 18 from view and damage.

Turning to FIGS. 4A through 4D, one sees that the fabric panel 16 could be employed as a "B" surface in that it could underlie and provide support for an outer "A" surface, which could comprise a flat panel fabric, a foam material, a padded material or member, a pillow, any combination thereof, or any other possible overlying material. In such a case, an "A" layer material 38 can be disposed overlying the fabric panel 16 and left loose or fastened in place in any appropriate manner. In the embodiment of FIGS. 4A through 4D, the "A" layer material 38 is secured in place by mechanical fasteners 32, such as staples, tacks, or any other means. In this case, the mechanical fasteners 32 are driven through the "A" layer material 38 and directly into the locking spline 18 within the groove 26.

In the alternative construction of FIGS. 5A through 5E, an "A" layer material 38 again overlies the fabric panel 16 and is again secured in place by mechanical fasteners 32. In this embodiment, however, the "A" layer material 38 is secured relative to a secondary groove 34 that has an insert 36, such as a rubber spline cord or the like, disposed therein. The secondary groove 34 is disposed inboard of the groove 26. With this, the "A" layer material 38 automatically overlies and protects the fabric panel 16 and the locking spline 18. It is possible, of course, that the secondary groove 34 could be foregone and the "A" layer material could simply be secured directly to the framework 12 by any suitable means.

In FIGS. 6A through 6C, one sees that an embodiment of the invention can be constructed wherein the framework 12 includes a central portion, in this case a central peninsula 42, for engaging the hardware of a standard chair base mechanism (not shown), which is particularly advantageous since the frame structure 10 therefore does not require a specifically designed base mechanism. The central peninsula 42 can have one or more C-shaped channels 44 or other means for engaging the chair base mechanism in an adjustable manner. Still further, pad members 14 can be disposed about the periphery of the framework 12 for enhancing the comfort and performance of the frame structure 10. To maintain the structural integrity and position of the pad members 14, a retaining wall 40 can be disposed inboard thereof. The framework 12 can further include a plurality of fastener apertures 46 for retaining chair arms or the like (not shown).

Figure 8B:
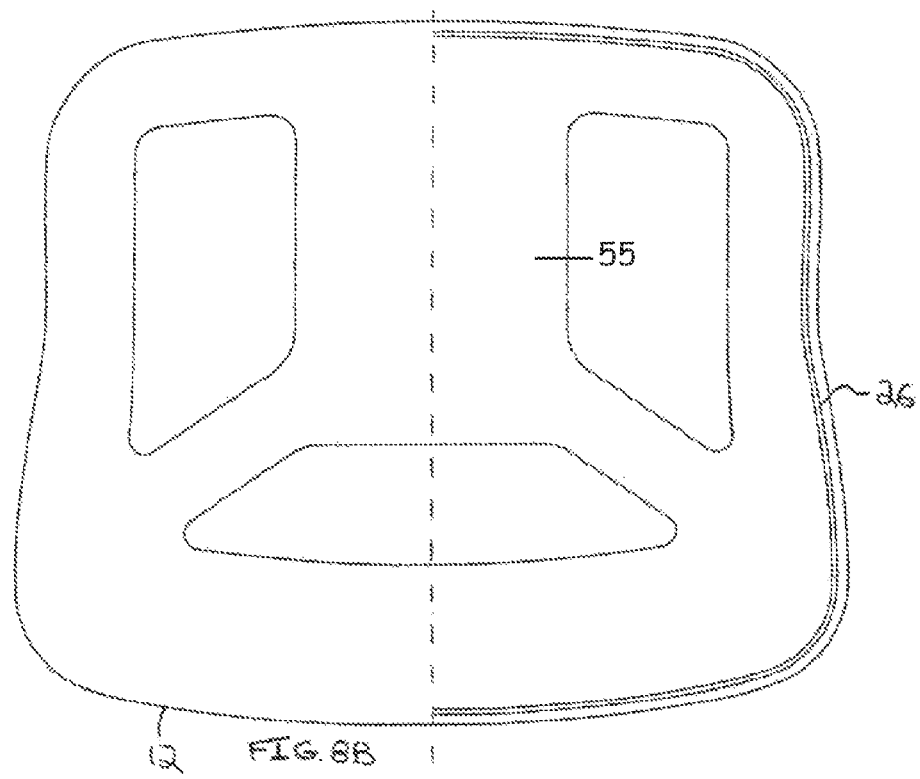
FIG. 8B comprises sectioned, portioned top and bottom plan views of another frame structure according to the present invention.

In the variant of FIGS. 7A through 7C, the C-shaped channels 44 are replaced by fastener apertures 48 for acting as an alternative means for coupling to a chair base mechanism. Also, the rearward pad member 14 and the retaining wall 40 of FIG. 6A are eliminated. While the peninsula 42 can be considered useful for a number of reasons, including its ability to add resilience to the framework 12, it is equally possible for the framework 12 simply to have a central portion 55 that can be joined at both ends to the peripheral portion of the framework 12. For example, as is shown in FIG. 8A, the central portion 55 can simply traverse from a front portion to a rear portion of the framework 12. Also, as FIG. 8B shows, the central portion 55 can be joined to the remainder of the framework 12 in a Y-shaped format.

The embodiment of FIGS. 9A and 9B again shows that a retaining wall 40 can be disposed inboard of a pad member 14. Also, a groove 26 can be employed for retaining the fabric panel 16 while a secondary groove 34 can be employed to retain an "A" surface material 38. The groove 26 would again receive a locking spline 18 for retaining a fabric panel 16, and the secondary groove 34 would again retain an insert 36 for enabling an attachment of an "A" layer material.

As FIGS. 10A through 10C and 11A through 11C emphasize, the present invention can be employed relative to substantially any structure. In those drawings, for example, the fabric panel 16 is retained relative to an arm pad framework 12. In FIGS. 10A through 10C, the arm pad framework 12 provides a continuous support surface underlying the fabric panel 16. In FIGS. 11A through 11C, the arm pad framework 12 has an open central area. Still further, in FIG. 11C, the arm pad framework 12 has a secondary groove 34 for enabling the application of an "A" surface material over the fabric panel 16. Fastening apertures 35 are provided for enabling a coupling of the framework 12 to an external structure, such as an arm support member of a chair structure (not shown).

Looking to FIGS. 12A through 12E, one sees that the locking spline 18 can have one or both of its sidewalls with a non-smooth surface for enhancing the ability of the groove 26 and the locking spline 18 to retain the fabric panel 16 in place most securely. Alternatively or additionally, the groove 26 can have one or both sidewalls with a non-smooth surface for the same purpose as is also depicted in FIGS. 12A and 12E. In the present embodiment, both the locking spline 18 and the groove 26 have serrated sidewalls such that they mechanically engage one another in supplementation of the previously described frictional engagement therebetween. More particularly, the locking spline 18 has a plurality of barbs 50 on its sidewalls while the groove 26 has a plurality of furrows 52. The barbs 50 and the furrows 52 can be correspondingly numbered, shaped, and/or located.

Figure 20:
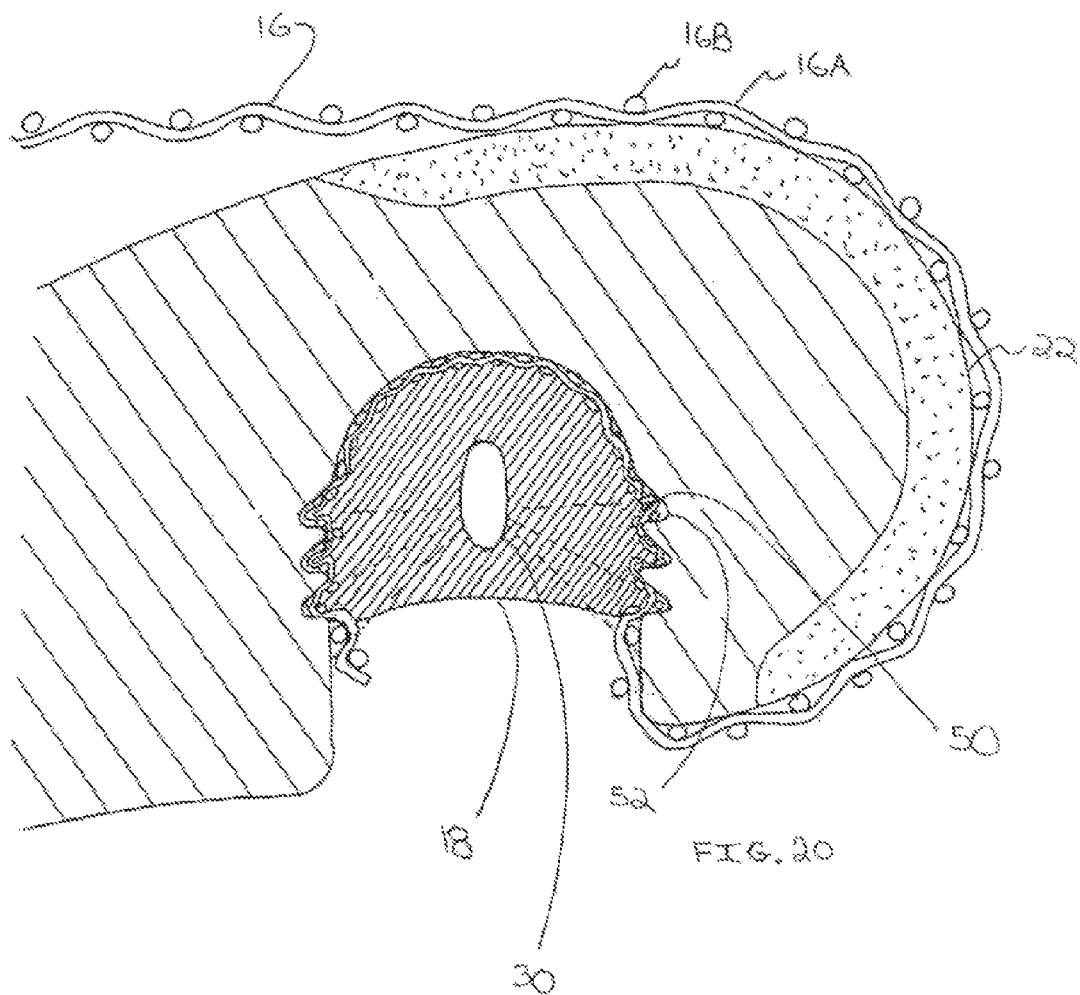
FIG. 20 is a cross sectional view of a portion of a frame structure according to the present invention.

As FIG. 20 shows, a fabric panel 16 can be considered to be formed by a plurality of longitudinal fibers 16A and a plurality of lateral fibers 16B. Some or all of the longitudinal fibers 16A and the lateral fibers 16B can be elastomeric. Advantageously, the locking spline 18 can securely engage and retain each longitudinal fiber 16B thereby securely retaining the fabric panel in general. This is particularly true when the locking spline 18 is provided with barbs 50 and/or when the groove 26 has furrows 52. Further ensuring the secure locking of the fabric panel 16, the locking spline 18 engages the fabric panel 16 over greater than a 180 degree span.

Figure 21:
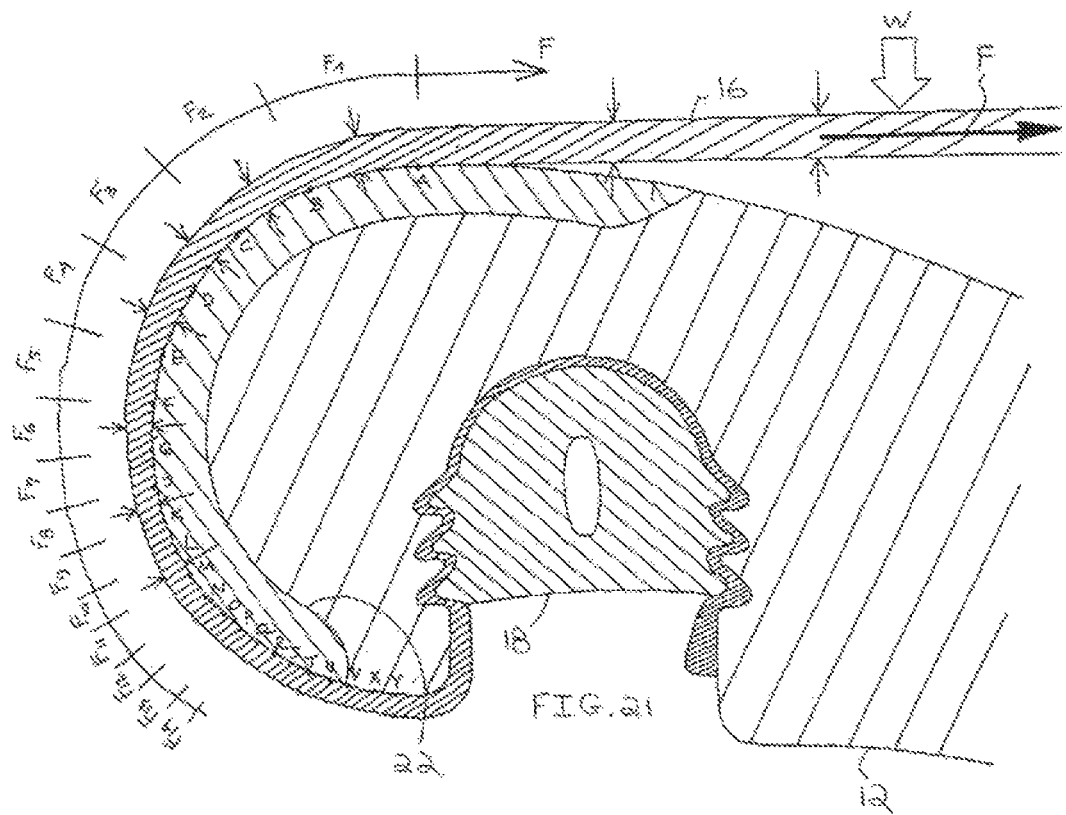
FIG. 21 is a cross sectional view of a frame structure according to the present invention depicted a force dissipation.

Looking to FIG. 21, an embodiment of the framework 12 is shown wherein the groove 26 is again disposed to the reverse side of the framework 12 such that the fabric panel 16 reverses over a curved peripheral edge of the framework 12 to reach the obverse side of the framework 12 before traversing the open area of the framework 12. Under this arrangement, the force F deriving from a weight W applied to the fabric panel 16, such as from the weight of a seat occupant, is progressively dissipated from the point at which the fabric panel 16 reaches the framework 12 to the point at which the fabric panel 16 reaches the groove 26 and the locking spline 18. The force dissipation is advantageous in static load situations and is particularly advantageous in impact load situations.

As such, the force $F_1$ at point B is slightly less than the original force F at point A, the force $F_2$ at point C is slightly less than the force $F_1$ at point B, and so on. With this, the force actually applied to the groove 26 and the locking spline 18 is substantially lessened, and the ability of the groove 26 and the locking spline 18 to retain the fabric panel 16 securely is significantly improved. The force dissipation can be improved even further where the fabric panel 16 travels over the resiliently compressible interior impact absorbing member 22 due to the frictional interaction therebetween. It will be appreciated that, while the force dissipation is exemplified in relation to the frame structure 10 with the groove 26 disposed to the obverse side of the framework 12, force dissipation exists also relative to embodiments wherein the groove 26 is disposed in the peripheral edge and even to the obverse side of the framework 12.

Figure 22:
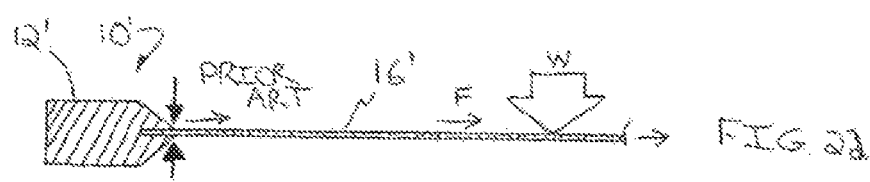
FIG. 22 is a cross sectional view of a prior art frame structure.

This force dissipation is in marked opposition to the typical prior art frame structure 10', which is depicted in FIG. 22. There, the peripheral edge of a fabric panel 16' is directly retained by a framework 12' with no prior overlapping of the framework 12' or any other member. As a result, the entire force F deriving from the weight W must be born directly by the retaining means in the prior art frame structure 10'. This stress concentration can lead to failure, particularly in impact load situations.

Under this construction, the locking spline 18 can be inserted into the groove 26 with the fabric panel 16 interposed therebetween with the barbs 50 and furrows 52 ensuring a secure mechanical engagement. As one can appreciate from FIGS. 12B, 12C, and 12D, the locking spline 18 could be crafted and installed in a number of different forms. For example, the locking spline 18 could be extruded or otherwise formed in continuous lengths as in FIG. 12B, in mid-length segments as in FIG. 12C, and/or in relatively short segments as in FIG. 12D. Different lengths of locking spline 18 can be used in combination where necessary or desirable. Still further, as one can see most clearly from FIG. 12E, the groove 26 can have an exposed wall for enabling a ready trimming of the fabric panel 16. The exposed wall in FIG. 12E comprises an extended portion of the proximal side wall of the groove 26 such that a trimming operation can be carried out from exterior to the framework 12.

As one can appreciate by reference to FIGS. 12A and 12F, the locking spline 18 can in any case be formed in varied widths. For example, the width of the locking spline 18 can vary from a relatively wide width, such as that referenced at A, to a relatively thin width, such as that referenced at E. Advantageously, such a calibration of the width of the locking spline 18 relative to the width of the groove 26 can enable the same width groove 26 to be employed in retaining fabric panels 16 of varied thicknesses. Where a relatively thin fabric panel 16 is to be applied, a relatively wide locking spline 18 can be employed. Where a relatively thick fabric panel 16 is to be applied, a relatively thin locking spline 18 can be employed to enable it and the fabric panel 16 to fit within the groove 26.

By reference to FIGS. 13A and 13B, one will again appreciate that the fabric panel 16 can be employed as a "B" surface material. There, the fabric panel 16 is designed to support a pillow or other removable "A" surface member 54. Further depicted in FIGS. 13A and 13B is that the fabric panel 16 can be further secured in place by a plurality of mechanical fasteners 32 that can be received into the locking spline 18.

FIGS. 14A through 14C show that the groove 26 can have a plurality of barb-shaped furrows 52 therein while the locking spline 18 can have a relatively smooth periphery. For example, the locking spline 18 can have a generally circular cross section except for a longitudinal groove 51 therein. With this, where the locking spline 18 is formed from a compressible material, it can be pressed into the groove 26 in the framework 12 with the longitudinal groove 51 in the locking spline 18 allowing a further yielding and resilient compression of the locking spline 18. Again, the locking spline 18 can be formed in continuous lengths or in shorter lengths as shown in FIG. 14C.

Figure 26:
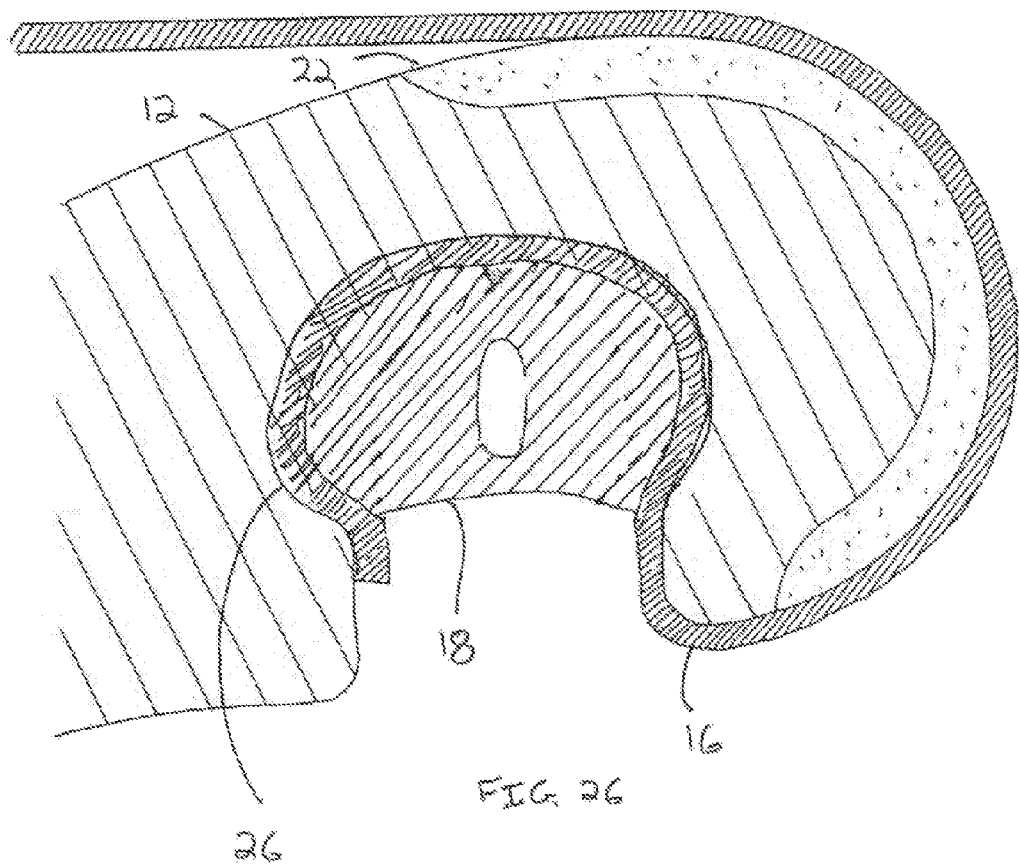
FIG. 26 is a cross sectional view of still another frame structure and locking spline arrangement.
Figure 27:
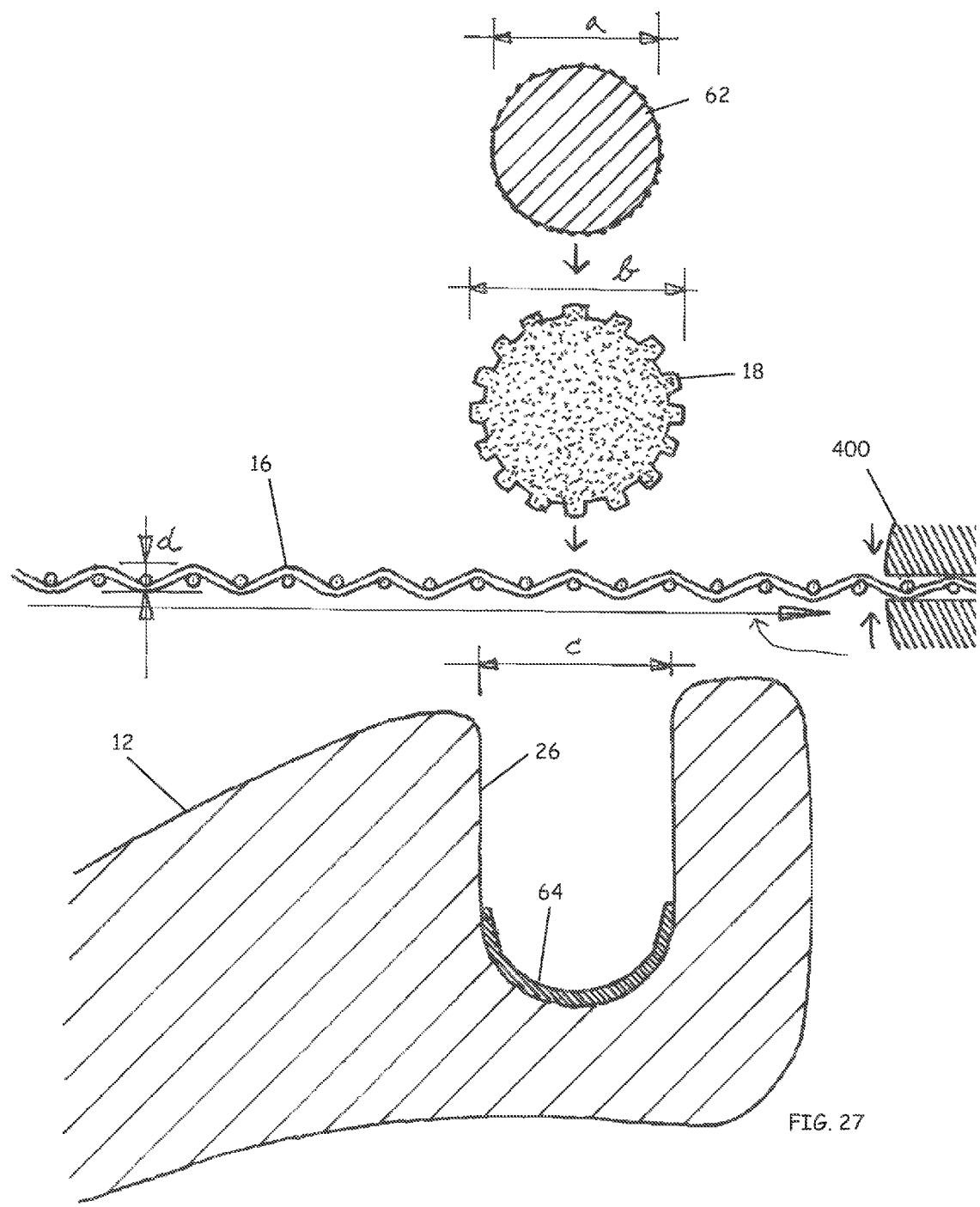
FIG. 27 is a cross sectional view of a further frame structure and locking spline arrangement in a preliminary stage of assembly.

Embodiments of the invention are contemplated wherein the groove 26 has a broadened portion. The broadened portion could comprise the deepest or proximal portion of the groove 26 as is shown in FIG. 26. In such an embodiment, the locking spline 18 can be retained both by friction and by a mechanical engagement between the locking spline 18 and the groove once the locking spline 18 has been pressed into the groove 26.

Particularly where the locking spline 18 is formed in shorter lengths, one could contemplate the insertion of segments of locking spline 18 into the groove 26 by an automated insertion device. The automated insertion device could, of course, take many forms. In one presently contemplated manifestation, the insertion device essentially comprises an insertion gun that could insert segments of locking spline 18 in series by use of cartridge, a serial coupling of multiple segments of locking spline, or any other suitable arrangement.

In the alternative arrangement of FIGS. 15A through 15C, the groove 26 has opposed longitudinal receiving channels 56 therealong. With this, the fabric panel 16 can be secured in place by one or more resiliently compressible V-shaped or U-shaped members 58 with outwardly turned end portions. In one embodiment, the resiliently compressible members 58 can be formed of a spring material, such as a resiliently deflectable metal. As FIG. 15C shows, the resiliently compressible members 58 can vary in length.

Figure 16A:
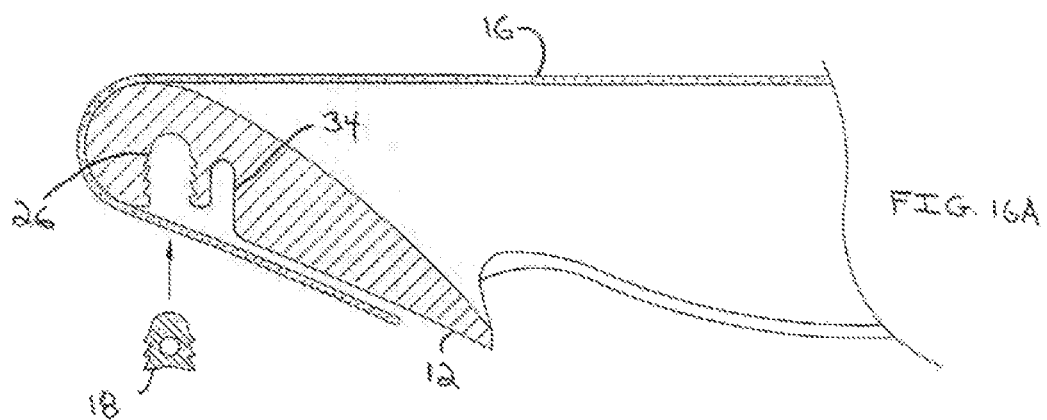
FIGS. 16A, 16B, and 16C comprise sectioned views in front elevation of frame structures according to the present invention in first, second, and third stages of manufacture.
Figure 16B:
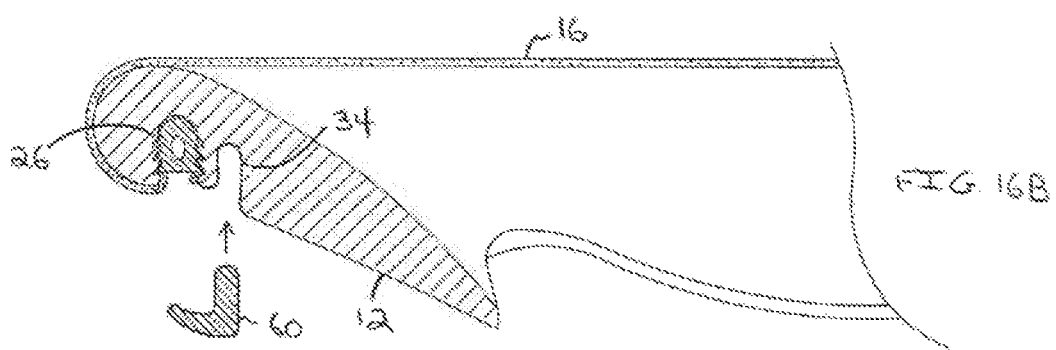
Figure 16C:
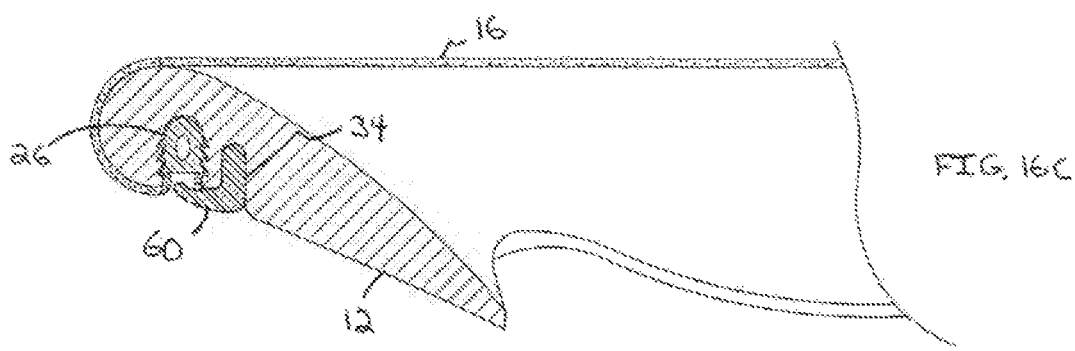

In the embodiment of FIGS. 16A through 16C, a secondary groove 34 is disposed inboard of the groove 26. A shield member 60, which in this case is L-shaped, is received into the secondary groove 34 with a leg of the L-shaped shield member 60 at least partially overlying the groove 26. With this, the locking spline 18 is further shielded from damage and tampering.

Figure 17:
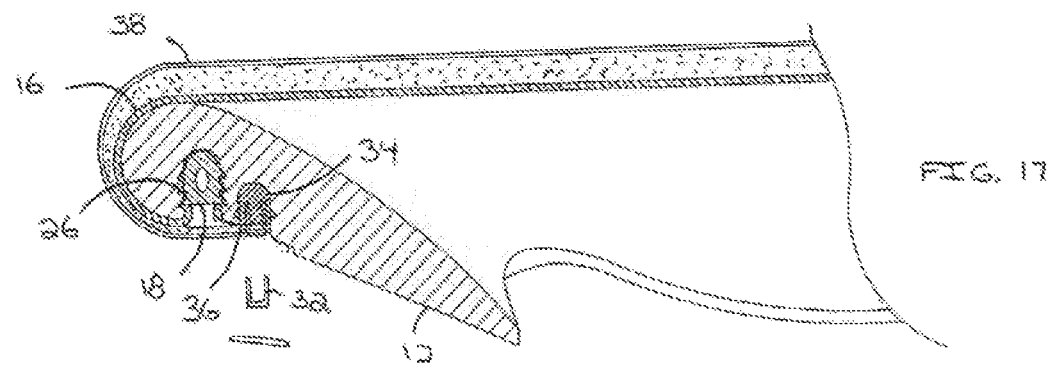
FIG. 17 is a sectioned view in front elevation of an even further frame structure according to the present invention.

In FIG. 17, an "A" surface material 38 overlies the fabric panel 16 and is secured in place by a plurality of mechanical fasteners 32 that engage an insert 36 that is disposed in a secondary groove 34. The secondary groove 34 is again disposed inboard of the groove 26. With this, the fabric panel 16 and the locking spline 18 are shielded.

Figure 18:
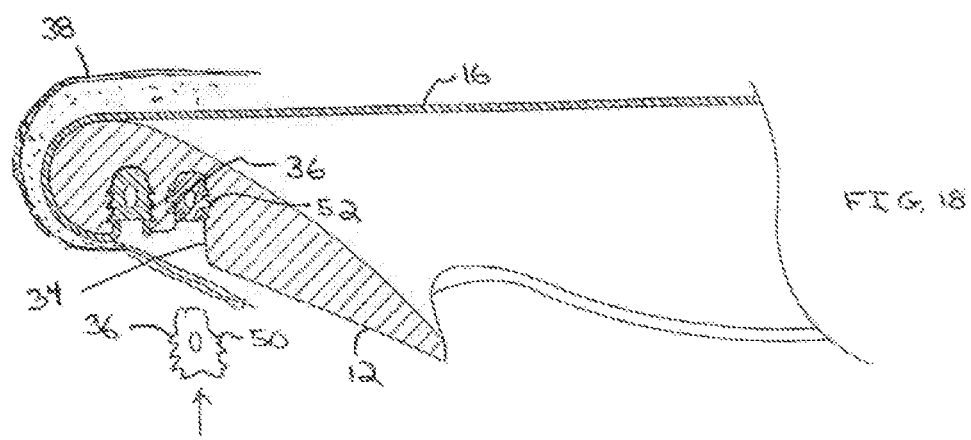
FIG. 18 is a sectioned view in front elevation of another frame structure pursuant to the present invention.

Looking to FIG. 18, an "A" surface material 38 again is disposed over the fabric panel 16. In this embodiment, the "A" surface material 38 is retained in place by use of an insert 36 that is received into a secondary groove 34 that is disposed inboard of the groove 26. The insert 36, which can comprise a continuous spline or plural individual members, has a plurality of barbs or serrations 50 disposed thereon. The secondary groove 34 can have a plurality of longitudinal channels or furrows 52 communicating along opposed walls thereof. Under this arrangement, the serrations 50 on the insert 36 can mechanically engage the channels 52 on the secondary groove 34 to ensure that the "A" surface material 38 is securely retained.

In each of the abovedescribed embodiments, the peripheral edge of the fabric panel 16 can be retained securely in place when the locking spline 18 is disposed within the groove 26. The fabric panel 16 can simply be secured in place with no pretensioning. Alternatively, a given degree of pretensioning can be induced to establish desired performance characteristics for the fabric panel 16 and the frame structure 10 in general. Pretensioning can be particularly advantageous where the frame structure 10 forms a part of an article of furniture, such as a seat bottom as is depicted in a plurality of the drawings presented herewith.

In certain embodiments, the initial tension can be generally uniform along the length of the peripheral edge of the fabric panel 16, and the fabric panel 16 can have uniform elastic and other properties in each direction. Other embodiments of the invention are possible wherein the initial tension can be non-uniform along the peripheral edge of the fabric panel 16. Alternatively or additionally, the elastic properties of the fabric panel 16 can vary along the length thereof. By either or both methods, the fabric panel 16 and the frame structure 10 can be calibrated to have variable performance characteristics. For example, with a variable pretensioning pattern and/or a fabric panel 16 with variable elastic properties, an elastic fabric panel 16 can have varied deflection properties.

Figure 19:
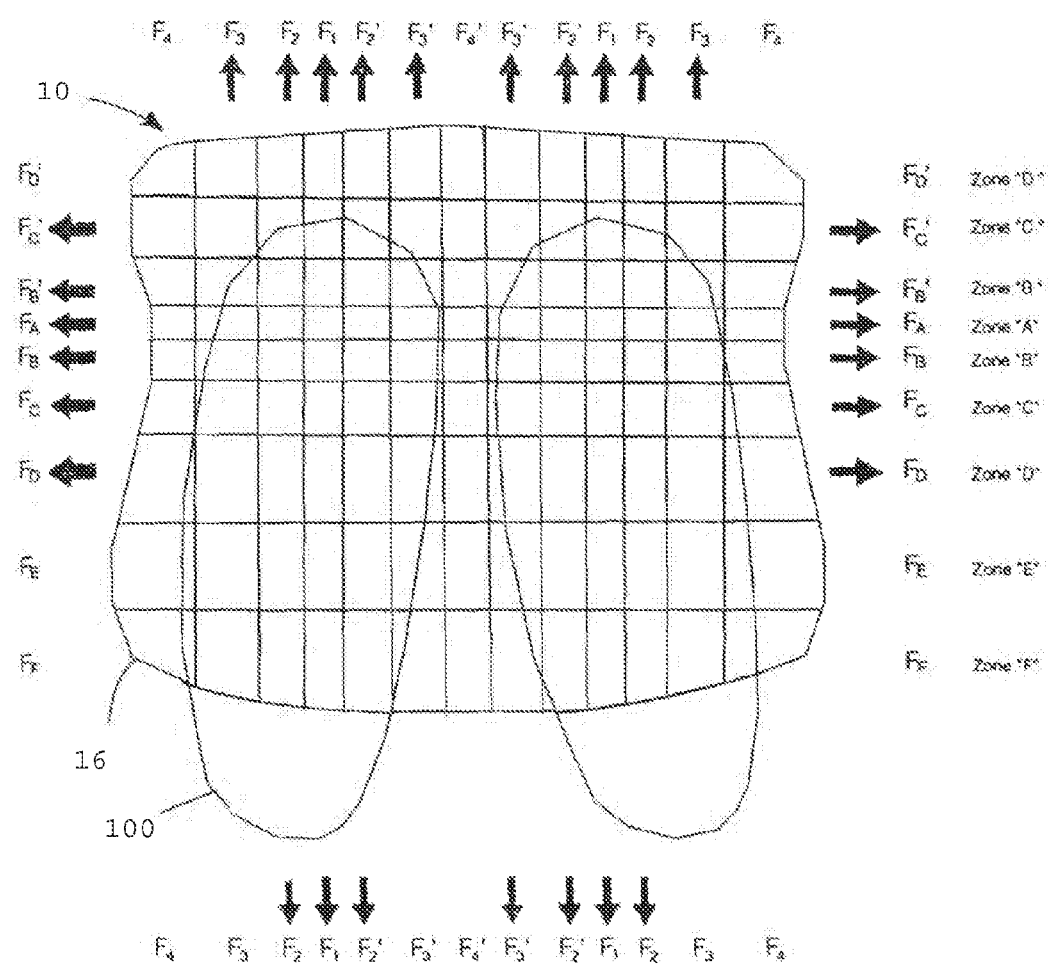
FIG. 19 is a schematic view of a seat bottom frame structure with variable tension and deflection zones.

With proper calibration, therefore, the tension and deflection properties of the fabric panel 16 can be controlled in zones as is exemplified in FIG. 19. There, the schematically depicted frame structure 10 comprises a seat bottom for supporting the legs 100 of a seat occupant. The tension and deflection zones of the fabric panel 16 vary in proportion to the force characteristics exhibited by a typical seat occupant both in what can be considered a longitudinal direction aligned with the legs 100 of the seat occupant and a lateral direction. In the longitudinal direction, maximum support can be provided where the greatest longitudinal force $F_1$ due to the weight of the seat occupant can be expected to reduced support where lesser longitudinal forces $F_2$, $F_3$, and $F_4$ $F_2'$, $F_3'$, and $F_4'$ would typically be expected. In the lateral direction, maximum support can be provided where the greatest lateral forces $F_A$ would be likely to progressively reduced support where lesser lateral forces $F_B$, $F_C$, $F_D$, $F_E$, and $F_F$ and $F_B'$, $F_C'$, and $F_D'$ would be typical. As such, the longitudinal and lateral support zones will intersect and combine with one another to achieve an overall support pattern.

With certain details and embodiments of the present invention for methods and arrangements for securing fabric disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

I claim as deserving the protection of Letters Patent:

1. An arrangement for securing fabric relative to a framework, the arrangement comprising:
   a framework;
   a groove in the framework; and
   a locking spline for being received into the groove in the framework;
   a safety cord for being received into the groove in the framework atop the locking spline; and
   a secondary locking material operably associated with the locking spline for additionally securing the locking spline within the groove;
   whereby a fabric panel can be retained relative to the framework by an insertion of the locking spline into the groove with a portion of the fabric panel disposed between the locking spline and the groove.

2. The arrangement of claim 1 wherein the framework has an obverse side, a peripheral edge, and a reverse side.

3. The arrangement of claim 2 wherein the groove is disposed to the reverse side of the framework whereby the fabric panel can be applied to the framework with a portion of the fabric panel retained within the groove and with the fabric panel reversing over the peripheral edge of the framework and traversing at least a portion of the framework.

4. The arrangement of claim 2 wherein the groove is disposed in the peripheral edge of the framework whereby fabric panel can be applied to the framework with a portion of the fabric panel retained within the groove and with the fabric panel reversing over a portion of the framework and traversing at least a portion of the framework.

5. The arrangement of claim 1 wherein the groove has a broadened proximal portion whereby the locking spline can be mechanically retained within the groove.

6. The arrangement of claim 1 wherein the locking spline is formed from a resiliently compressible material.

7. The arrangement of claim 2 further comprising an interior impact absorbing member disposed along the peripheral edge of the framework for underlying the fabric panel to prevent crushing and damage to the same.

8. The arrangement of claim 2 further comprising an exterior impact absorbing member for overlying the fabric panel along the peripheral edge of the framework to prevent crushing and damage to the fabric panel.

9. The arrangement of claim 1 wherein the groove has a first edge and a second edge and wherein the fabric panel exits the groove to the first edge side of the groove and wherein the second edge of the groove extends distally relative to the first edge of the groove whereby the fabric panel is protected against crushing and damage.

10. The arrangement of claim 1 wherein the groove traverses adjacent to substantially an entire periphery of the framework and wherein the framework has a central portion for enabling a coupling of the framework to an external structure.

11. The arrangement of claim 1 wherein the groove has at least one sidewall with non-smooth surface.

12. The arrangement of claim 11 wherein the groove has at least one serrated sidewall.

13. The arrangement of claim 1 wherein the locking spline has at least one non-smooth surface.

14. The arrangement of claim 13 wherein the locking spline has at least one serrated surface.

15. The arrangement of claim 1 wherein the secondary locking material comprises a material applied in flowable form that hardens in place.

16. The arrangement of claim 15 wherein the secondary locking material comprises an adhesive.

17. The arrangement of claim 15 wherein the secondary locking material comprises a chemical hardening agent that induces a hardening of the locking spline.

* * * * *